(12) United States Patent
Hampton et al.

(10) Patent No.: US 10,571,030 B2
(45) Date of Patent: Feb. 25, 2020

(54) VALVE GATE WITHIN A VENTURI GAP OF A VENTURI DEVICE FOR PRODUCING VACUUM

(71) Applicants: Keith Hampton, Ann Arbor, MI (US); David E. Fletcher, Flint, MI (US); Brian M. Graichen, Leonard, MI (US); James H. Miller, Ortonville, MI (US)

(72) Inventors: Keith Hampton, Ann Arbor, MI (US); David E. Fletcher, Flint, MI (US); Brian M. Graichen, Leonard, MI (US); James H. Miller, Ortonville, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 11 days.

(21) Appl. No.: 15/711,108

(22) Filed: Sep. 21, 2017

(65) Prior Publication Data
US 2018/0080567 A1    Mar. 22, 2018

Related U.S. Application Data

(60) Provisional application No. 62/397,477, filed on Sep. 21, 2016.

(51) Int. Cl.
*F16K 3/02*  (2006.01)
*F16K 3/16*  (2006.01)
(Continued)

(52) U.S. Cl.
CPC ............ *F16K 3/0281* (2013.01); *B60T 13/72* (2013.01); *F02M 35/10229* (2013.01);
(Continued)

(58) Field of Classification Search
CPC . F16K 3/0281; F16K 3/14; F16K 3/16; F16K 3/18; F16K 3/188; F16K 3/28;
(Continued)

(56) References Cited

U.S. PATENT DOCUMENTS 1,552,614 A  *  9/1925  Kiley .................. F16K 3/12
                                                        251/327
1,708,805 A  *  4/1929  Smith ................. F16K 3/28
                                                        24/561
(Continued)

FOREIGN PATENT DOCUMENTS

CA           2019030        10/2000
WO        2015109306 A1      7/2015
WO        2015123009 A1      8/2015

OTHER PUBLICATIONS

WO, International Search Report and Written Opinion, Application No. PCT/US2017/052642, dated Nov. 30, 2017(7 Pages).
(Continued)

*Primary Examiner* — Mary E McManmon
*Assistant Examiner* — Richard K. Durden
(74) *Attorney, Agent, or Firm* — FisherBroyles, LLP; Susan M. Oiler

(57) ABSTRACT

Venturi devices are disclosed herein that include a body defining a Venturi gap between an outlet end of a converging motive section and an inlet end of a diverging discharge section, having a suction port in fluid communication with the Venturi gap, a gate valve linearly translatable to open and close the Venturi gap, and an actuator connected to the gate valve to operatively move the gate valve between an open position and a closed position. The gate valve, in a longitudinal cross-section, is generally U-shaped, thereby having continuous, opposing sides that one each close the motive outlet and the discharge inlet and defining a void between the opposing sides that is in fluid communication with the suction port. The converging motive section defines a circular-shaped motive inlet and defines an elliptical- or
(Continued)

polygonal-shaped motive outlet, and the diverging discharge section defines an elliptical- or polygonal-shaped discharge inlet.

19 Claims, 15 Drawing Sheets

(51) Int. Cl.
| | |
|---|---|
| *F02M 35/10* | (2006.01) |
| *F16K 27/04* | (2006.01) |
| *F16K 3/314* | (2006.01) |
| *F16K 3/28* | (2006.01) |
| *B60T 13/72* | (2006.01) |

(52) U.S. Cl.
CPC ............... *F16K 3/16* (2013.01); *F16K 27/04* (2013.01); *F16K 3/28* (2013.01); *F16K 3/314* (2013.01); *F16K 27/044* (2013.01)

(58) Field of Classification Search
CPC .. F16K 3/314; F16K 3/265; Y10T 137/87587; Y10T 137/87603; Y10T 137/87627
USPC .................... 251/326, 327, 329, 333, 334
See application file for complete search history.

(56) References Cited

U.S. PATENT DOCUMENTS

| | | | | |
|---|---|---|---|---|
| 2,195,923 A | * | 4/1940 | Hehemann | F16K 3/28 251/327 |
| 2,693,110 A | * | 11/1954 | Terrell | G01F 1/44 138/45 |
| 2,964,289 A | * | 12/1960 | Schmitz | F16K 3/28 251/175 |
| 3,537,681 A | * | 11/1970 | Wrenshall | F16K 3/12 251/193 |
| 3,658,087 A | * | 4/1972 | Nelson | E21B 34/04 137/454.6 |
| 3,666,231 A | * | 5/1972 | Parodi | F16K 31/06 251/129.1 |
| 3,728,891 A | | 4/1973 | Hall, Jr. | |
| 3,930,518 A | * | 1/1976 | Fuller | F16K 17/20 137/487 |
| 3,933,339 A | * | 1/1976 | Dietzsch | F16K 3/0254 251/176 |
| 4,301,993 A | * | 11/1981 | Waller | F16K 3/14 251/167 |
| 4,519,423 A | * | 5/1985 | Ho | B01F 5/045 137/888 |
| 5,040,576 A | | 8/1991 | Faeth | |
| 5,707,560 A | * | 1/1998 | Nevin | F02M 7/17 261/44.4 |
| 6,035,881 A | * | 3/2000 | Emmerich | B60T 17/02 137/113 |
| 2008/0057848 A1 | * | 3/2008 | Gray | B64D 41/00 454/69 |
| 2013/0213510 A1 | * | 8/2013 | Burnham | F16K 15/14 137/888 |
| 2014/0014080 A1 | * | 1/2014 | Beshay | F01M 13/022 123/574 |
| 2014/0165931 A1 | * | 6/2014 | Pursifull | F02M 35/10229 123/2 |
| 2014/0165962 A1 | * | 6/2014 | Pursifull | B60T 13/46 123/349 |
| 2014/0353534 A1 | | 12/2014 | Graichen et al. | |
| 2014/0360607 A1 | | 12/2014 | Fletcher et al. | |
| 2015/0060709 A1 | | 3/2015 | Fletcher et al. | |
| 2015/0159665 A1 | | 6/2015 | Fletcher et al. | |
| 2015/0159677 A1 | | 6/2015 | Hampton et al. | |
| 2015/0233393 A1 | | 8/2015 | Burnham et al. | |
| 2015/0285401 A1 | | 10/2015 | Niedert et al. | |
| 2015/0345517 A1 | | 12/2015 | Fletcher et al. | |
| 2015/0354600 A1 | | 12/2015 | Fletcher et al. | |

OTHER PUBLICATIONS

CN, First Office Action with English Translation; Chinese Application No. 2017800578206 (dated Jul. 29, 2019) (12 pages).
CN, First Office Action Search Report with English Translation; Chinese Application No. 2017800578206 (dated Jul. 29, 2019) (4 pages).

* cited by examiner

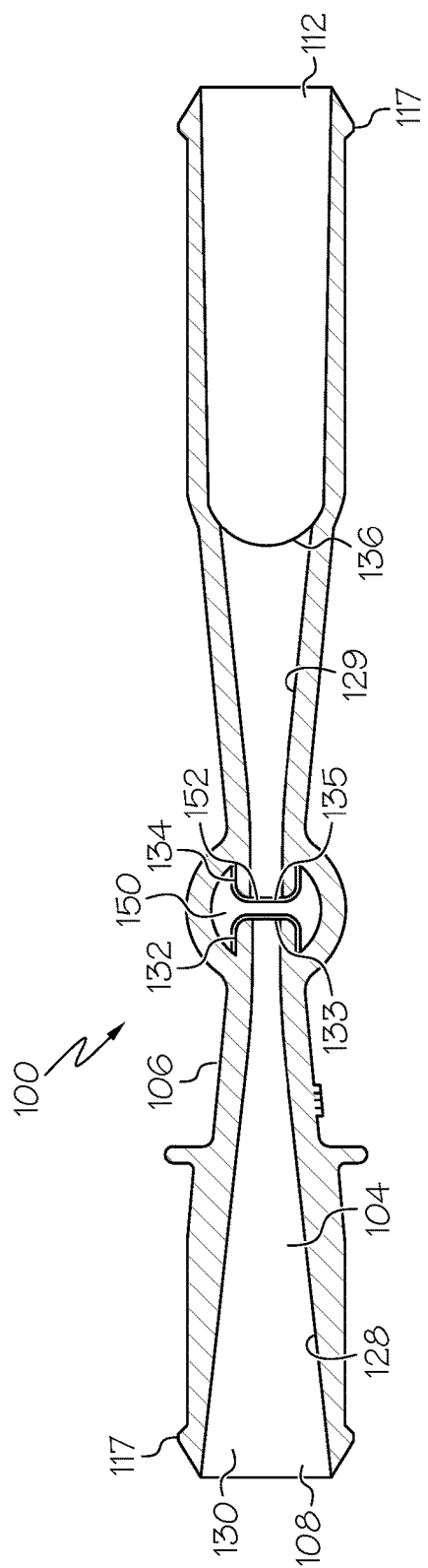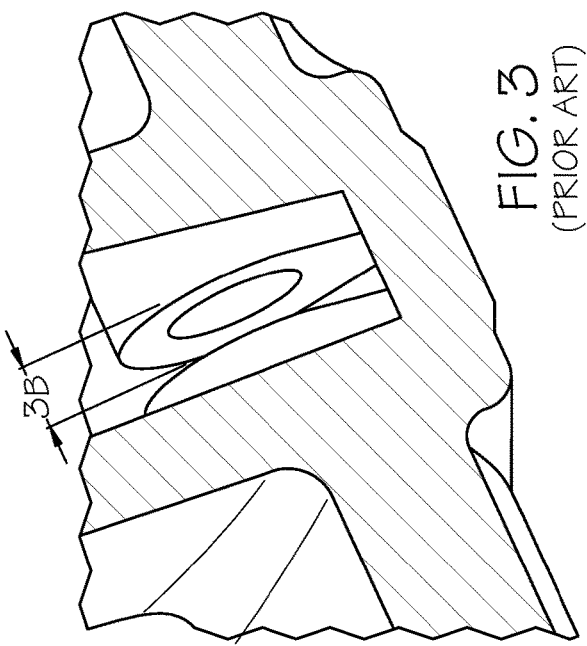

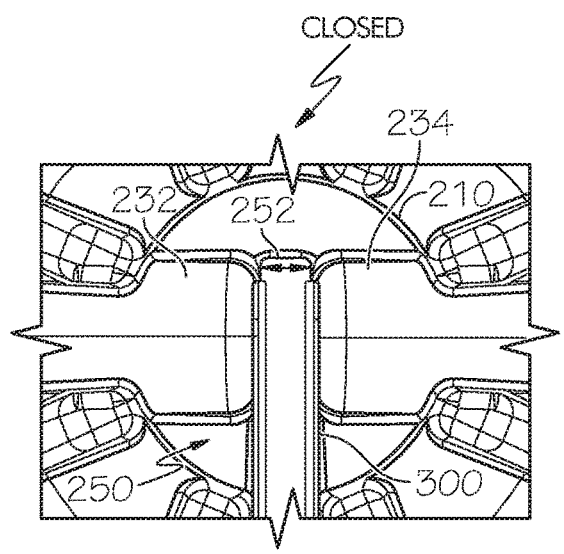
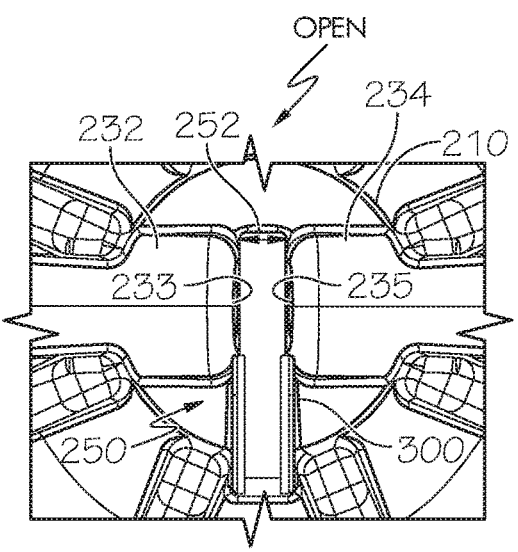
FIG.12   FIG.13
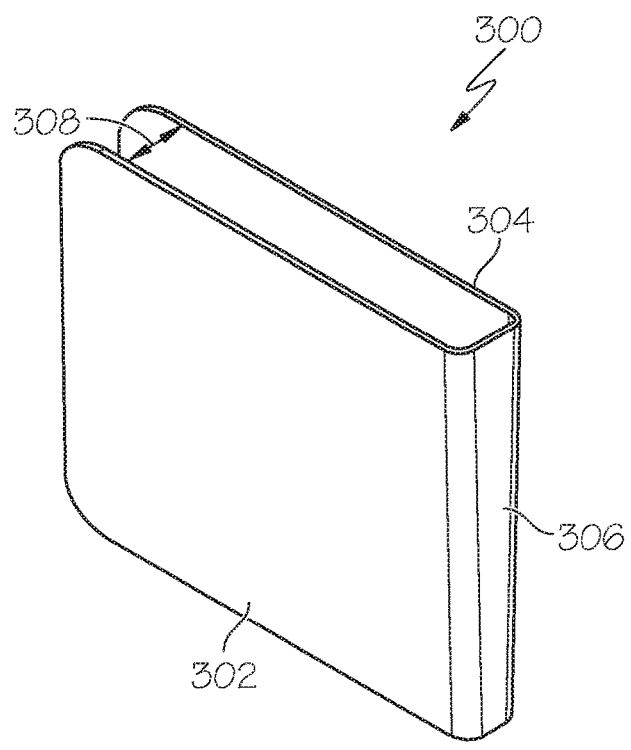
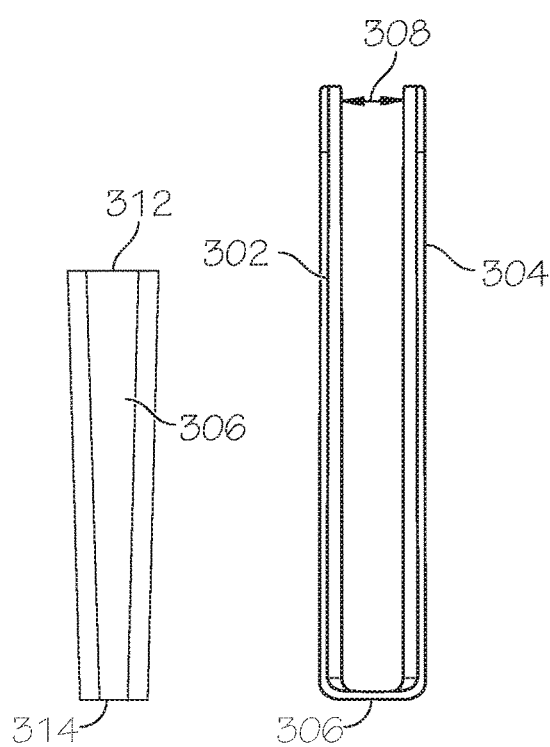
FIG.14   FIG.15   FIG.16

|  |  | 10kPa SOURCE VACUUM | 20kPa SOURCE VACUUM |
|---|---|---|---|
| GATED ASPIRATOR | FLOW (g/s) | 1.770 | 2.281 |
| NON-GATED ASPIRATOR | FLOW (g/s) | 1.677 | 2.237 |
| GATED ASPIRATOR | SUCTION VACUUM (Pa) | 30937 | 52885 |
| NON-GATED ASPIRATOR | SUCTION VACUUM (Pa) | 30023 | 55023 |

VALVE GATE WITHIN A VENTURI GAP OF A VENTURI DEVICE FOR PRODUCING VACUUM

RELATED APPLICATIONS

This application claims the benefit of U.S. Provisional Application No. 62/397,477, filed Sep. 21, 2016, which is incorporated herein by reference in its entirety.

TECHNICAL FIELD

This application relates to Venturi devices for producing vacuum using the Venturi effect, more particularly to such devices having a valve gate within the Venturi gap to control flow through the Venturi gap.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is a Venturi device that generates vacuum by creating an engine air flow path through the Venturi device to generate a suction vacuum. The flow through (i.e., into the motive section of) existing Venturi devices is typically controlled by a valve in series therewith, which entails connections, tubing, assembly steps, etc. This results in a system where the Venturi device is a small part of a large, heavy, and relatively expensive system. There is a need to simplify this system, and to make it more compact, lighter, and affordable.

SUMMARY

Venturi devices are disclosed herein that generate increased vacuum pressure and increased suction mass flow rates while decreasing the consumption of engine air. These devices include a body defining a Venturi gap between an outlet end of a converging motive section and an inlet end of a diverging discharge section. The converging motive section has an elliptical- or polygonal-shaped internal cross-section motive outlet and the diverging discharge section has an elliptical- or polygonal-shaped internal cross-section discharge inlet, and the converging motive section and the diverging discharge section, together, define an inner passageway formed by hyperboloid curves connecting a motive inlet to the elliptical or polygonal-shaped motive outlet or the elliptical or polygonal-shaped discharge inlet to a discharge outlet. In one embodiment, at least one of the motive inlet or the discharge outlet has a circular internal cross-section.

The Venturi devices may include a suction port defining a void in fluid communication with the Venturi gap. Here, a first portion of the body that defines the outlet end of the converging motive section and a second portion of the body that defines the inlet end of the diverging discharge section lay on the surface of the void and the void extends downward around the sides of both the first body portion and the second body portion. In one embodiment, the exterior profile of both the first portion and the second portion of the body generally match the internal cross-section of the inlet end and the outlet end, respectively.

In one aspect, the Venturi devices for generating vacuum have a body defining a Venturi gap between an outlet end of a converging motive section and an inlet end of a diverging discharge section, and a suction port in fluid communication with the Venturi gap, a gate valve linearly translatable to open and close the Venturi gap, and an actuator connected to the gate valve to operatively move the gate valve between an open position and a closed position. The converging motive section defines a circular-shaped motive inlet and defines an elliptical- or polygonal-shaped motive outlet, and the diverging discharge section defines an elliptical- or polygonal-shaped discharge inlet. The gate valve is generally U-shaped (in longitudinal cross-section) thereby having continuous, opposing sides that one each close the motive outlet and the discharge inlet and define a void therebetween that is in fluid communication with the suction port. The opposing sides of the gate valve each act as a leaf spring, biased generally away from one another, into engagement with the outlet end of the converging motive section and the inlet end of the diverging section, respectively.

The lower body defines a gate pocket that transects a central longitudinal axis of the converging motive section, so that the gate valve enters from the side of the lower body and has the shortest stroke distance possible. The gate valve is slidingly seated within the gate pocket, and has a trapezoid-shaped back or some other polygonal-shaped back that is wider at an end more proximate the suction port.

Any of the embodiments of the Venturi device may have a pneumatic actuator or an electromagnetic actuator, such as a solenoid actuator, connected to the gate valve to operatively move the gate valve between an open position and a closed position.

All embodiments of the Venturi device typically have the gate valve positioned relative to the elliptical- or polygonal-shaped motive outlet and/or discharge inlet for linear translation at the shortest stroke distance, which is in a plane parallel to a minor axis of the motive outlet or discharge inlet.

In all of the embodiments of the Venturi device, the converging motive section defines an inner passageway that transitions as a hyperbolic function from the circular-shaped motive inlet to the elliptical- or polygonal-shaped motive outlet, and wherein the elliptical- or polygonal-shaped motive outlet has an area that is less than the area of the circular-shaped motive inlet. The suction port may extend downward around the sides of the outlet end of the converging motive section and the sides of the inlet end of the diverging discharge section and defines a void between all sides thereof, and the exterior profile of the outlet end of the converging motive section and the inlet end of the diverging discharge section generally match their respective internal shapes.

In all embodiments of the Venturi device, the elliptical- or polygonal-shaped motive outlet has a ratio of a major axis to a minor axis of about 2 to about 4, and the elliptical- or polygonal-shaped discharge inlet is offset, relative to the elliptical- or polygonal-shaped motive outlet, by the ratio of the difference of the discharge inlet area and the motive outlet area to the peak motive flow rate ((discharge inlet area−motive outlet area)/peak motive flow rate) times a constant is greater than 0.28, wherein the constant is equal to the speed of sound times the density of the fluid at the motive outlet. The Venturi gap is proportional to the (motive mass flow rate)$^n$, wherein n 0.25 to 0.8.

In a system, such as an internal combustion engine system of an automobile, the suction port in fluid communication with a device requiring vacuum and the converging motive section in fluid communication with a source of fluid. The source of fluid connected to the motive inlet is a compressor of a super- or turbocharger in an internal combustion engine, and the discharge exit is in fluid communication with the intake manifold of the internal combustion engine. In another embodiment, the source of fluid is atmospheric air from an air intake filter, and the discharge exit is in fluid communication with the intake manifold of the internal combustion engine.

BRIEF DESCRIPTION OF THE DRAWINGS

FIG. 2 is a top plan view, in cross-section, of the Venturi device of FIG. 1.

FIG. 3 is a side, cross-sectional perspective view taken along a plane parallel to the central longitudinal axis B at the junction of the suction port in the Venturi device in a prior art Venturi device having circular transverse cross-sections in the motive section and the discharge section.

FIG. 12 a top plan view of the suction port showing the gate valve in the closed position.

FIG. 13 a top plan view of the suction port showing the gate valve in the open position.

FIG. 14 is side, perspective view of the gate valve.

FIG. 15 is a plan view of the back of the gate valve.

FIG. 16 is a top plan view of the gate valve.

DETAILED DESCRIPTION

Figure 1:
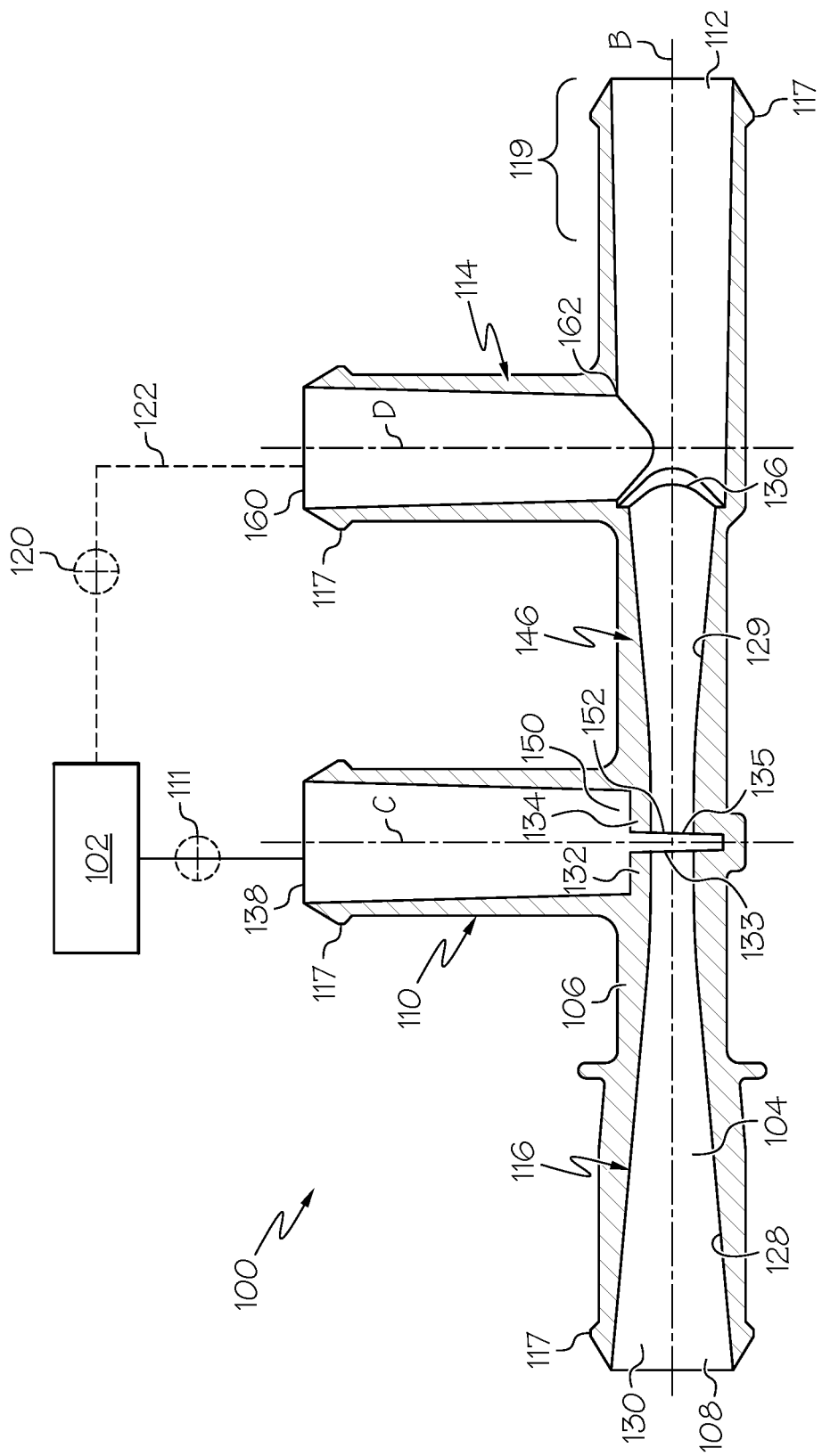
FIG. 1 is a side, longitudinal cross-sectional plan view of one embodiment of an Venturi device.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIGS. 1 and 2 illustrate different views of a Venturi device 100. The Venturi device 100 may be used in an engine, for example, in a vehicle's engine to provide vacuum to a device. In FIG. 1 the Venturi device 100 is connected to a device requiring vacuum 102, and the Venturi device 100 creates vacuum for said device 102 by the flow of air through a passageway 104, extending generally the length of the Venturi device, designed to create the Venturi effect. Venturi device 100 includes a body 106 defining passageway 104 and having three or more ports that are connectable to an engine or components connected thereto. The ports include: (1) a motive port 108, which may be connected to a source of clean air, e.g., from the engine intake air cleaner as represented by a box 290 in FIG. 11, that is positioned upstream of a throttle; (2) a suction port 110, which can connect via an optional check valve 111 to the device requiring vacuum 102; (3) an outlet 112, which is connected to an engine intake manifold, for example, represented by box 292 in FIG. 11, downstream of the throttle of the engine; and, optionally, (4) a bypass port 114. Each of the respective ports 108, 110, 112, and 114 may include a connector feature 117 on the outer surface thereof for connecting the respective port to a hose or other component in the engine.

Check valve 111 is preferably arranged to prevent fluid from flowing from the suction port 110 to the application device 102. In one embodiment, the device requiring vacuum 102 is a vehicle brake boost device, positive crankcase ventilation (PCV) device, or fuel purge device. In another embodiment, the device requiring vacuum 102 is a hydraulic valve. The bypass port 114 may be connected to the device requiring vacuum 102 and, optionally, may include a check valve 120 in the fluid flow path 122 therebetween. Check valve 120 is preferably arranged to control the flow of fluid to or from the bypass port 114 to the application device 102.

Referring now to FIGS. 2 and 3, the Venturi device 100 is generally a "T-shaped" Venturi device defining an inner passageway along a central longitudinal axis B bisected by the suction port 110. The inner passageway 104 includes a first tapering portion 128 (also referred to herein as the motive cone) in the motive section 116 of the body 106 coupled to a second tapering portion 129 (also referred to herein as the discharge cone) in the discharge section 146 of the body 106. Here, the first tapering portion 128 and the second tapering portion 129 are aligned end to end having the motive outlet end 132 facing the discharge inlet end 134 and defining a Venturi gap 152 therebetween, which defines a fluid junction placing the suction port 110 in fluid communication with both the motive section 116 and the discharge section 146 of the inner passageway 104. The Venturi gap 152 as used herein means the lineal distance between the motive outlet end 132 and the discharge inlet end 134.

When an Venturi device, such as Venturi device 100, is for use in a vehicle engine, the vehicle manufacturer typically selects the size of both the motive port 108 and outlet 112 based on the tubing/hose size available for connection of the Venturi device to the engine or components thereof. Additionally, the vehicle manufacturer typically selects the maximum motive flow rate available for use in the Venturi device, which in turn will dictate the area of the interior opening defined at the motive outlet end 132, i.e., the motive outlet 133. Accordingly, the vehicle manufacturer's selected parameters for the particular engine dictate the ratio of the motive outlet 133 to the outlet 112. Working within these constraints, the disclosed Venturi devices 100 significantly reduce the compromise between the desire to produce high suction flow rates at low (5 kPa to 30 kPa) source/discharge pressures and increased depth of vacuum at higher (30 kPa to 60 kPa) source discharge pressures. This reduction in the compromise is accomplished by changing the configuration for the motive outlet 133 and the discharge inlet 135 (defined by the discharge inlet end 134) to increase the perimeter of the inner passageway 104 at the motive outlet end 132 and the discharge inlet end 134, such as presented in FIGS. 5 and 6.

Figure 5B:
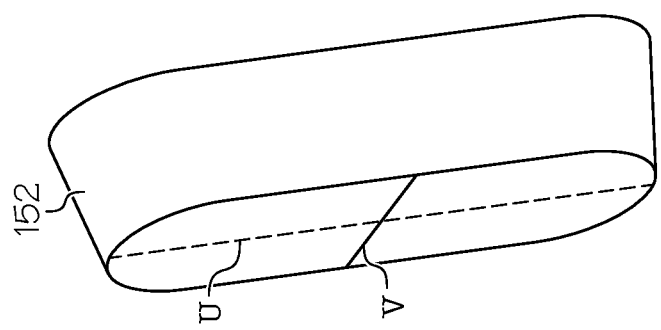
FIG. 5B is a representation of the volume of the Venturi gap in FIG. 5A.
Figure 5A:
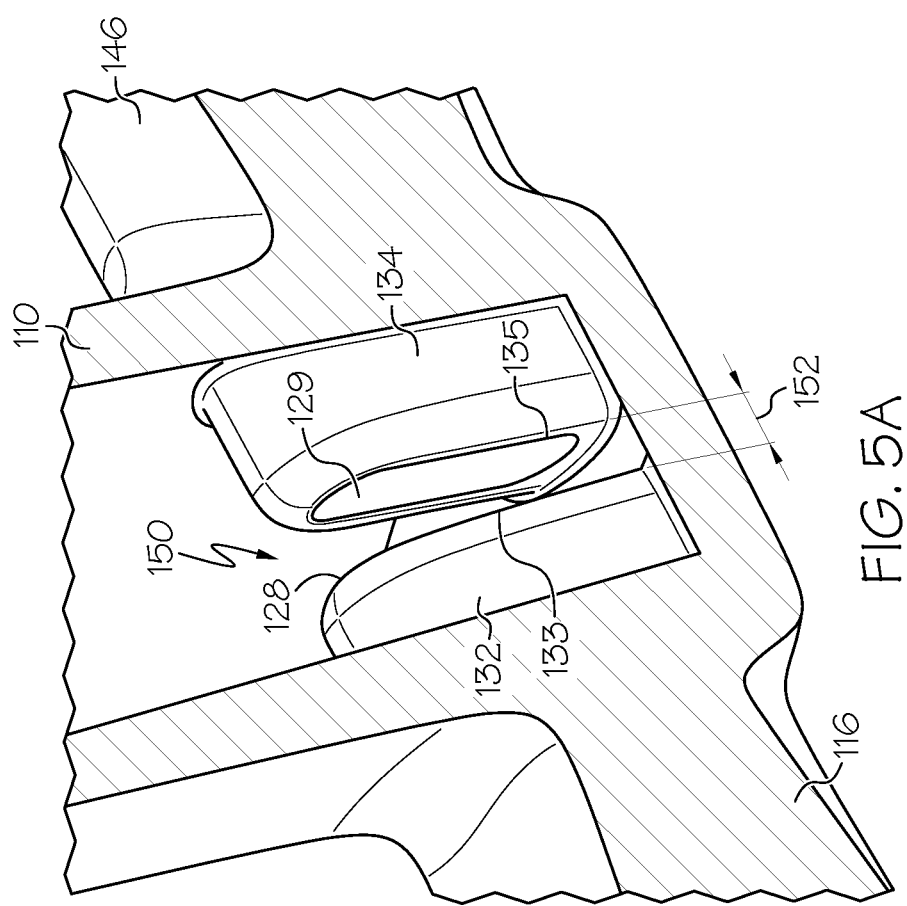
FIG. 5A is a side, cross-sectional perspective view taken along a plane parallel to the central longitudinal axis B at the junction of the suction port in another embodiment of an Venturi device.
Figure 6:
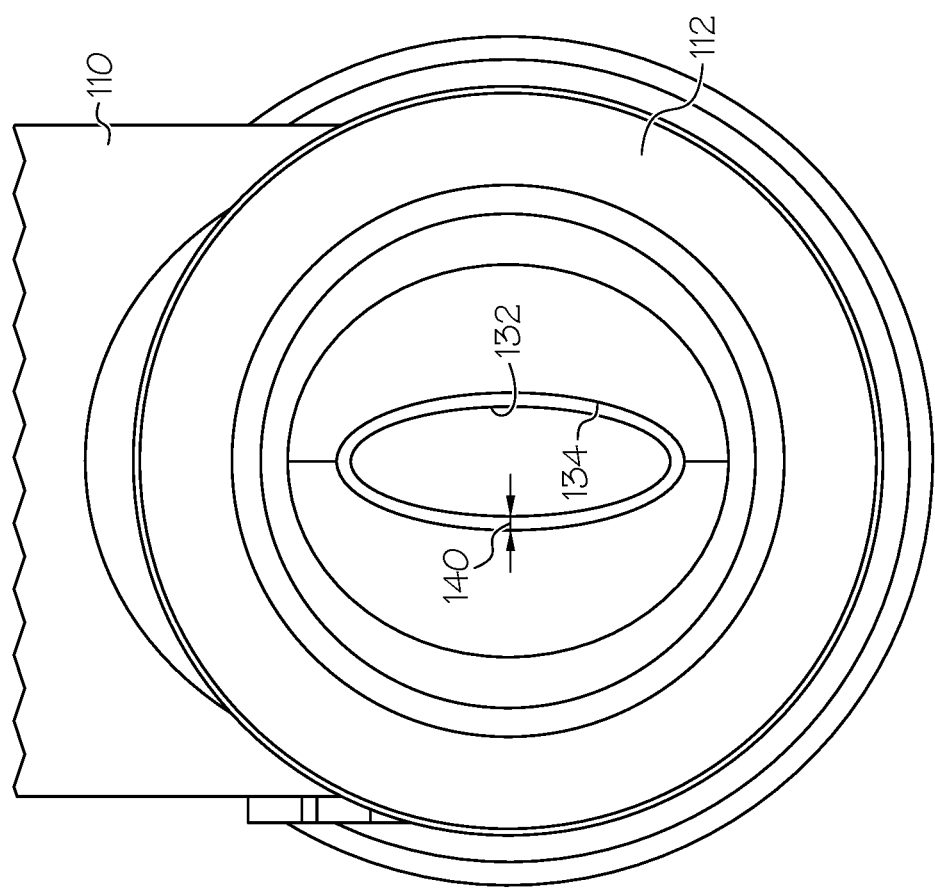
FIG. 6 is a plan view looking into the Venturi device from the Venturi device outlet showing the offset between the motive outlet end and the discharge inlet end.
Figure 7:
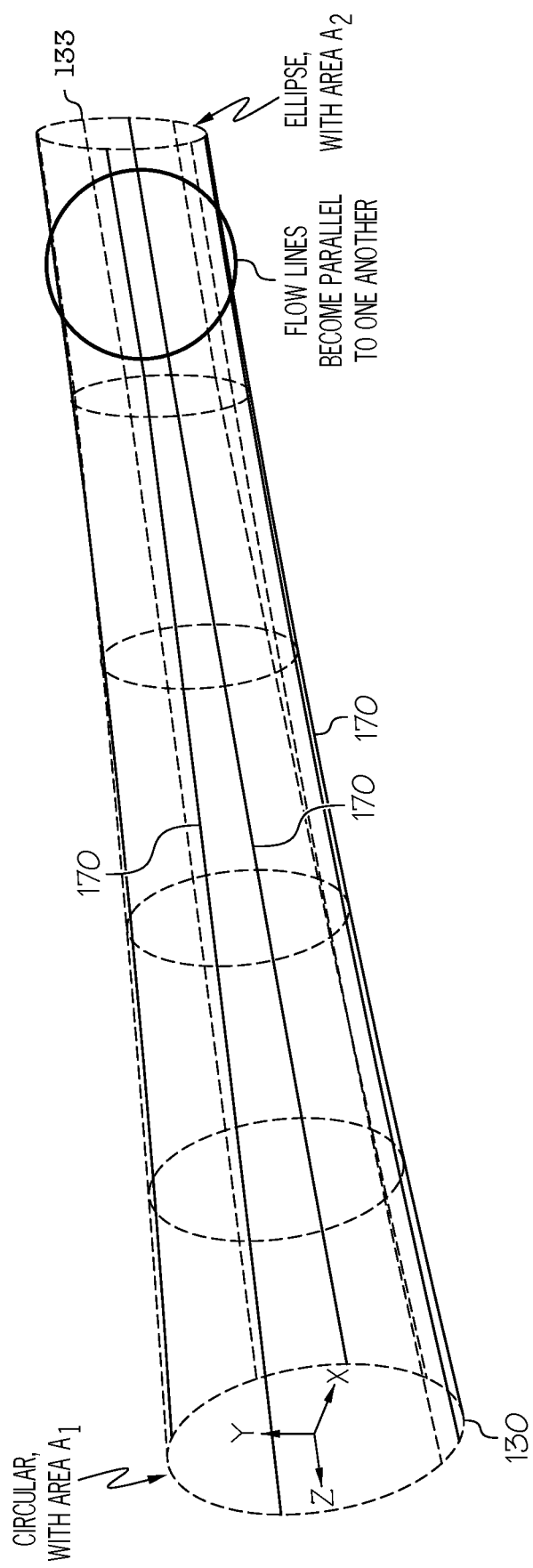
FIG. 7 is a model of the internal passageway within the motive section of the Venturi device.

As illustrated in FIGS. 5A-5B and 6, at least the interior surface of the motive outlet end 132 (the motive outlet 133) and the interior surface of the discharge inlet end 134 (the discharge inlet 135) are ellipse-shaped, but may alternately have a polygonal form. The interior of the inner passageway 104 extending away from the motive outlet end 132 and away from the discharge inlet end 134, in opposite directions, from the Venturi gap 152, may be constructed to have the same general shape. FIG. 7 illustrates one embodiment of the shape of the internal passageway within the motive section of the Venturi device, but equally, if rotated 180 degrees illustrates the internal passageway within the discharge section. The internal passageway in FIG. 7 begins at the motive inlet end 130 as a circular opening having an area $A_1$ and gradually, continuously transitions, as a hyperbolic or parabolic function, to an ellipse opening at the motive outlet 133 that has an area $A_2$, which is smaller than $A_1$. The circular opening at the motive inlet end 130 is connected to the ellipse-shaped motive outlet 133 by hyperbola lines 170 that provide the advantage of flow lines at the motive outlet end 132 being parallel to one another. The motive inlet end 130 and the discharge outlet end 136 may also define ellipse-shaped or some other polygonal form openings at some point prior thereto and transition from said shapes to a circular cross-section to form a hose connecting portion, for example similar to hose-connecting portion 119, having connector features 117 on the exterior thereof.

To form the "T" shape of the Venturi device 100 the suction port 110 has a central longitudinal axis C generally perpendicular to the body's central longitudinal axis B. The optional bypass port 114 may likewise have a central longitudinal axis D that is generally perpendicular to the body's central longitudinal axis B. As illustrated in FIG. 1, the bypass port 114 may intersect the second tapering section 129 adjacent to, but downstream of the discharge outlet end 136. The body 106 may thereafter, i.e., downstream of this intersection of the bypass port, continue with a cylindrically uniform inner diameter until it terminates at the outlet 112. In another embodiment (not shown), the bypass port 114 and/or the suction port 110, rather than being perpendicular, may be canted relative to axis B and/or to one another. In the embodiment of FIG. 2, the suction port 110 and the bypass port 114 are aligned with one another and have the same orientation relative to the body's central longitudinal axis B. In another embodiment, not shown, the suction port 110 and the bypass port 114 may be offset from one another and can be positioned relative to components within the engine that they will connect to for ease of connection.

The suction port 110 includes a suction inlet 138 and a suction outlet, which is the discharge inlet 135, and similarly to the first tapering section 128, may gradually, continuously taper as a cone along its length from the larger dimensioned suction inlet 138 to a smaller dimensioned suction outlet 135 or it can be a generally cylindrical tube. The bypass port 114, when present, may also gradually, continuously taper as a cone along its length, in particular from a smaller dimensioned end 162 to a larger dimensioned end 160, or it can be a generally cylindrical tube. Depending upon the attachment of the Venturi device into a system, the bypass port 114 may operate with the larger dimensioned end 160 as the inlet and the smaller dimensioned end 162 as the outlet or vice versa.

As best seen in FIGS. 2 and 5, at the motive outlet end 132 of the first tapering portion 128, juxtaposed to the second tapering portion 129, the suction port 110 includes an enlarged region defining a void 150 in fluid communication with Venturi gap 152 or conversely the Venturi gap 152 may be considered part of void 150. The fluid junction of the suction port 110 with inner passageway 104 is generally centered relative to the Venturi gap 152 and the void 150 is generally aligned with the suction port's central longitudinal axis C and transitions the first tapering portion 128 into the second tapering portion 129. The void 150 may be shaped as parallelepiped whose length is similar to the suction port's interior cross-section dimension(s), but whose bottom is an arcuate projection projecting downward away from the suction port 110. In a cross-section taken transverse to the body's central longitudinal axis B along the suction port's central longitudinal axis C, the void is seen to be generally U-shaped around and/or over the discharge inlet end 134 and the motive outlet end 132 as best understood by viewing FIGS. 2, 4A, and 5A in combination. As seen in FIGS. 2 and 5A, the suction port extends downward around the sides of the motive outlet end 132 and the sides of the discharge inlet end 134 and defines the void 150 between all sides thereof. As seen in FIG. 5A, the exterior profile of the motive outlet end 132 and the discharge inlet end 134 both generally match their respective internal shapes.

In Venturi device 100, the flow of motive air through the first tapering portion 128 increases its speed, which creates low static pressure in the void 150. This low static pressure draws air from the suction port 110 into the Venturi gap 152 and into the discharge section 146 through the discharge inlet (suction outlet) 135.

The Venturi device 100 may be operated to meet the following geometric ratios:

| Representative Symbol | Ratio |
| --- | --- |
| A' | suction inlet area/suction outlet area |
| B' | motive inlet area/motive outlet area |
| C' | discharge outlet area/discharge inlet area |

There are also performance ratios as follows:

| Representative Symbol | Ratio |
|---|---|
| F | suction mass flow rate/motive mass flow rate |
| G | suction vacuum pressure/discharge vacuum pressure |

To maximize the ratio F for the hyperbolical flow passageways disclosed herein, the ratio A' should be between 3 and 12, and the ratio B' should be greater than 4, and the ratio C' should be greater than 4.

To maximize the ratio G for hyperbolical flow passageways, the ratio A' should be between 3 and 12, and the ratio B' should be greater than 4, and the ratio C' should be greater than 4.

In the prior art of FIG. 3, the outlet end of the motive cone and the inlet end of the discharge cone each have circular internal cross-sections and circular exterior profiles and thereby define a Venturi gap that is a frustum having a circular outer periphery. From this drawing, one of the limitations to suction flow is illustrated—the area at the fluid junction of the suction port to the motive cone and the discharge cone.

In a desire to increase the flow rate of air from the suction port into the Venturi gap 152 of the Venturi devices disclosed herein, the area of the Venturi gap is increased by increasing the perimeter of the outlet end 132 and the inlet end 134 without increasing the overall inner dimension of the first tapering section 128 and the second tapering section 129 (preferably with no increase in the mass flow rate). In particular, motive outlet end 132 and discharge inlet end 134 are changed from being circular to being non-circular as described above. There are an infinite number of possible shapes that are not circular, each with a perimeter and a cross sectional area. These include polygons, or straight-line segments connected to each other, non-circular curves, and even fractal curves. To minimize cost a curve is simpler and easy to manufacture and inspect, and has a desirable perimeter length.

Figure 4B:
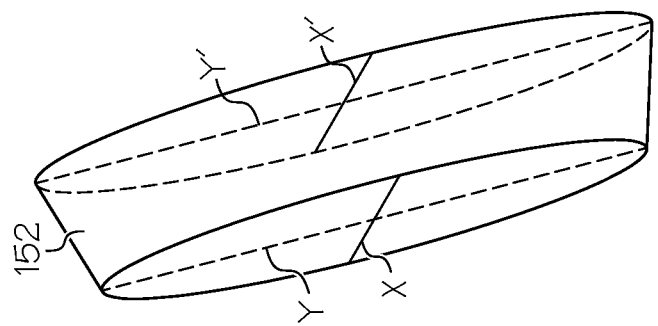
FIG. 4B is a representation of the volume of the Venturi gap in FIG. 4A.
Figure 4A:
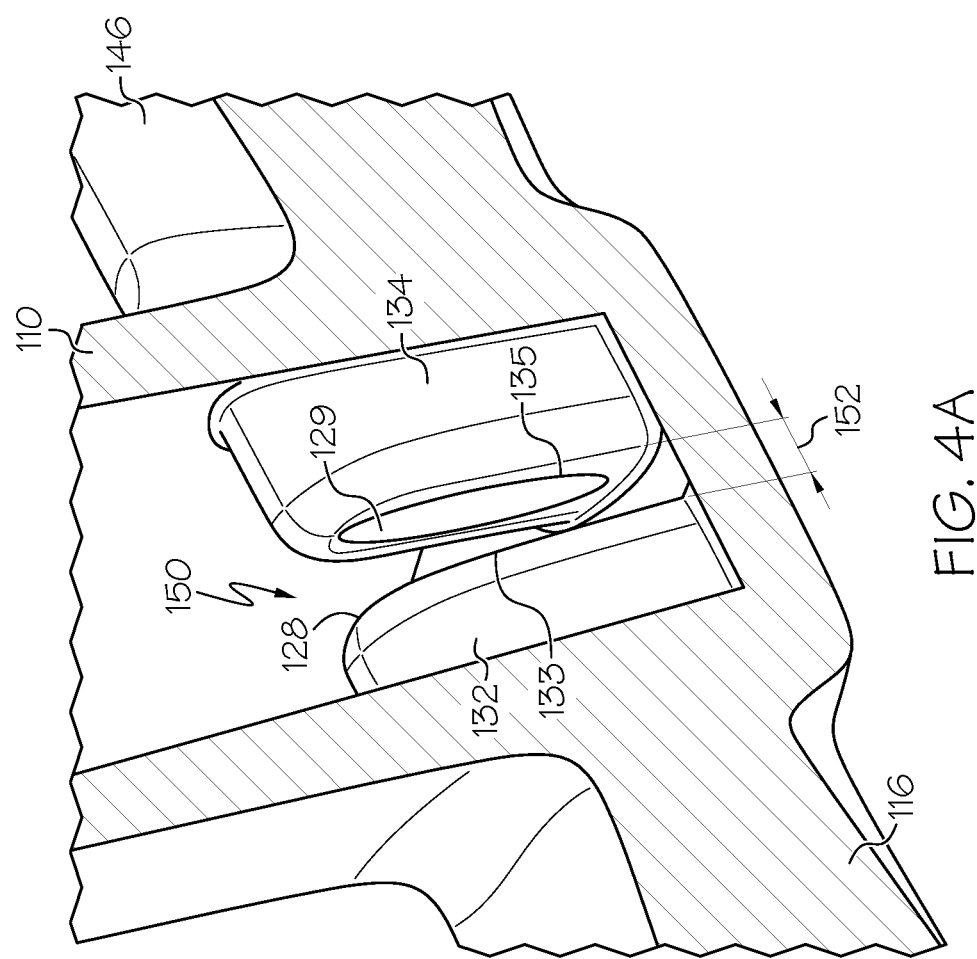
FIG. 4A is a side, cross-sectional perspective view taken along a plane parallel to the central longitudinal axis B at the junction of the suction port in the Venturi device of FIG. 2.

FIGS. 4A-AB and 5A-5B illustrate embodiments with improved fluid junctions where the suction port 110 meets the motive outlet end 132 and the discharge inlet end 134. The smallest area of the flow path from the suction port 110 to the Venturi gap 152 is the frustum defined between the motive outlet end 132 and the discharge inlet end 134, see FIGS. 4B and 5B. In FIGS. 4A and 4B, the outlet end 132 of the motive cone 128 and the inlet end 134 of the discharge cone 129 each have inner and outer elliptical perimeters and thereby define a Venturi gap 152 that is a frustum having an elliptical outer periphery. In FIGS. 5A and 5B, the outlet end 132 of the motive cone 128 and the inlet end 134 of the discharge cone 129 each have inner and outer generally rectangular-shaped perimeters (with rounded corners) and thereby define a Venturi gap 152 that is a frustum having a generally rectangular-shaped outer periphery. While the embodiments in the figures have the same perimeter for the outlet end 132 and the inlet end 134, i.e., both are elliptical or both are generally rectangular, the outlet end 132 and the inlet end 134 may have differently shaped perimeters, i.e., one may be elliptical while the other is generally rectangular. Additionally, the motive outlet end 132 and the discharge inlet end 134 may terminate with a rounded chamfer to improve the directionality of the flow of the fluid from the suction port 110 in to the discharge inlet end 134.

Additionally, as seen most clearly in FIG. 6, but is also seen in the frustums of FIGS. 4B and 5B, the outlet end 132 of the motive cone 128 for each embodiment is dimensionally smaller than the inlet end 134 of the discharge cone 129. This difference in dimension is identified as offset 140. In FIG. 4B, for example, the offset is seen in that the length of the major axis Y of the motive outlet end 132 is less than the length of the major axis Y' of the discharge inlet end 134 and may also have a length of the minor axis X of the motive outlet end 132 that is less than the length of the minor axis X' of the discharge inlet end 134.

In any of the elliptical- or polygonal-shaped embodiments, the elliptical- or polygonal-shaped internal cross-section of the motive outlet end of the converging motive section has a ratio of the major axis to the minor axis of about 2 to about 4, and the elliptical- or polygonal-shaped internal cross-section of the inlet end of the diverging discharge section is offset, relative to the elliptical- or polygonal-shaped internal cross-section of the outlet end of the converging motive section, by the ratio of the difference of the discharge inlet area and the motive outlet area to the peak motive flow rate, which is then multiplied by a constant $k_1$ to have a unitless ratio of greater than 0.28.

$$\text{Offset ratio} = (\text{discharge inlet area} - \text{motive outlet area})/\text{peak motive flow rate} * k_1 \quad (V)$$

where $k_1$ is:

$$k_1 = c \text{ at the motive outlet end} * D_{fluid} \text{ at the motive outlet end;} \quad (VI)$$

and c is the speed of sound and $D_{fluid}$ is the density of the fluid (typically air).

In any of the elliptical- or polygonal-shaped embodiments, the Venturi gap between the motive outlet end and the discharge inlet end has a gap ratio defined as the area of the Venturi gap divided by the motive flow times a constant $k_2$ (to have a unitless ratio).

$$\text{gap ratio} = \text{area of the Venturi gap/motive flow rate} * k_2 \quad (VII)$$

where $k_2$ is:

$$k_2 = c \text{ at the motive outlet end} * D_{fluid} \text{ at the motive outlet end;} \quad (VIII)$$

and c and $D_{fluid}$ are as defined above. Here, the gap ratio is greater than 4.7.

In one embodiment, the elliptical- or polygonal-shaped internal cross-section of the motive outlet end 132 has an eccentricity of between 0 to, and including 1. In another embodiment, the elliptical- or polygonal-shaped internal cross-section of the outlet end has an eccentricity of between about 0.4 to, and including about 0.97.

Referring again to FIGS. 4A and 4B, the outlet end 132 and the inlet end 134 are elliptical in profile thereby having a major axis (Y) and a minor axis (X). The equation of an ellipse can be defined as; $X^2/B^2 + Y^2/A^2 = 1^2$ Where A is the distance from the origin to the ellipse along the major axis Y and B is the distance from the origin to the ellipse along the minor axis X. The area of an ellipse is:

$$\text{Area of an ellipse} = \pi \times A \times B. \quad (I)$$

The perimeter of an ellipse is not given by a simple exact equation. Instead a series equation provides an acceptable approximation;

Perimeter of an ellipse=$\pi \times (A+B) \times (1+h^2/4+h^4/64+h^6/256\ldots)$ where h is:

Variable $h=(A-B)/(A+B)$. (III)

We can further define a term, eccentricity, which is a term that relates the length of the two axes. It is defined as:

Variable $e=(A^2-B^2)^{1/2}/A$. (IV)

Given a selected motive flow for the Venturi device design being chosen to be equivalent for calculations where the radius of the prior art circular Venturi device is 1 mm, the area is of 3.14 mm$^2$ with a perimeter of 6.28 mm. The ratio of perimeter to area is mathematically equal to 2 for a circular internal cross-section for the motive outlet end and the discharge inlet end.

For an ellipse of a given eccentricity we can compute the area, perimeter and the ratio of perimeter to cross sectional area in the disclosed embodiments. If we limit the area to be equal to that of a circle of radius of 1 mm, the calculated results are as follows;

TABLE 1

| | | | | | | ratio |
|---|---|---|---|---|---|---|
| | | | | | perimeter | perimeter to |
| | | | | | (mm) | area |
| e | A (mm) | B (mm) | h | area (mm$^2$) | | (mm$^{-1}$) |
| 0.000 | 1.000 | 1.000 | 0.000 | 3.142 | 6.283 | 2.000 |
| 0.431 | 1.053 | 0.950 | 0.051 | 3.143 | 6.297 | 2.004 |
| 0.586 | 1.111 | 0.900 | 0.105 | 3.141 | 6.335 | 2.017 |
| 0.691 | 1.176 | 0.850 | 0.161 | 3.140 | 6.406 | 2.040 |
| 0.768 | 1.250 | 0.800 | 0.220 | 3.142 | 6.518 | 2.075 |
| 0.827 | 1.333 | 0.750 | 0.280 | 3.141 | 6.673 | 2.125 |
| 0.872 | 1.429 | 0.700 | 0.342 | 3.143 | 6.886 | 2.191 |
| 0.906 | 1.538 | 0.650 | 0.406 | 3.141 | 7.160 | 2.280 |
| 0.933 | 1.667 | 0.600 | 0.471 | 3.142 | 7.522 | 2.394 |
| 0.953 | 1.818 | 0.550 | 0.535 | 3.141 | 7.983 | 2.541 |
| 0.968 | 2.000 | 0.500 | 0.600 | 3.142 | 8.578 | 2.731 |
| 0.979 | 2.222 | 0.450 | 0.663 | 3.141 | 9.345 | 2.975 |
| 0.987 | 2.500 | 0.400 | 0.724 | 3.142 | 10.349 | 3.294 |
| 0.992 | 2.857 | 0.350 | 0.782 | 3.141 | 11.682 | 3.719 |
| 0.996 | 3.333 | 0.300 | 0.835 | 3.141 | 13.504 | 4.299 |
| 0.998 | 4.000 | 0.250 | 0.882 | 3.142 | 16.102 | 5.125 |
| 0.999 | 5.000 | 0.200 | 0.923 | 3.142 | 20.041 | 6.379 |
| 1.000 | 6.667 | 0.150 | 0.956 | 3.142 | 26.653 | 8.483 |
| 1.000 | 10.000 | 0.100 | 0.980 | 3.142 | 39.919 | 12.707 |
| 1.000 | 20.000 | 0.050 | 0.995 | 3.142 | 79.783 | 25.396 |

So, by changing the eccentricity, the perimeter can be increased while holding the cross-sectional area fixed. This increase in perimeter provides the advantage of increasing the intersection area at the junction between the suction port, the motive cone, and the discharge cone, resulting in an increase in the suction port flow rate.

Referring now to FIGS. 5A and 5B, the motive outlet end 132 and the discharge inlet end 134 are generally rectangular in profile thereby having a length and a width and hence two axes, a major axis U and a minor axis V. As illustrated, the Venturi device's generally rectangular profile for the outlet end 132 and inlet end 134 include semicircular ends corresponding to the width of the rectangular portion. The orientation of the profile of the outlet and inlet ends 132, 134 should not be construed to be limited thereto. The area of this rectangle is equal to the sum of the areas of the two end semicircles plus the area of the straight section in between the semicircles. The perimeter of the rectangle is the lengths of the two sides plus the lengths of the semicircular ends. We can calculate the following;

TABLE 2

| Rectangle | | | | |
|---|---|---|---|---|
| A (mm) | B (mm) | area (mm$^2$) | perimeter (mm) | ratio of perimeter to area (mm$^{-1}$) |
| 1.000 | 1.000 | 3.142 | 6.283 | 2.000 |
| 1.272 | 0.950 | 3.142 | 6.614 | 2.105 |
| 1.563 | 0.900 | 3.142 | 6.981 | 2.222 |
| 1.876 | 0.850 | 3.142 | 7.392 | 2.353 |
| 2.214 | 0.800 | 3.142 | 7.854 | 2.500 |
| 2.583 | 0.750 | 3.142 | 8.378 | 2.667 |
| 2.989 | 0.700 | 3.142 | 8.976 | 2.857 |
| 3.441 | 0.650 | 3.142 | 9.666 | 3.077 |
| 3.951 | 0.600 | 3.142 | 10.472 | 3.333 |
| 4.534 | 0.550 | 3.142 | 11.424 | 3.636 |
| 5.212 | 0.500 | 3.142 | 12.566 | 4.000 |
| 6.018 | 0.450 | 3.142 | 13.963 | 4.444 |
| 6.997 | 0.400 | 3.142 | 15.708 | 5.000 |
| 8.226 | 0.350 | 3.142 | 17.952 | 5.714 |
| 9.829 | 0.300 | 3.142 | 20.944 | 6.667 |
| 12.031 | 0.250 | 3.142 | 25.133 | 8.000 |
| 15.280 | 0.200 | 3.142 | 31.416 | 10.000 |
| 20.623 | 0.150 | 3.142 | 41.888 | 13.333 |
| 31.202 | 0.100 | 3.142 | 62.832 | 20.000 |
| 62.725 | 0.050 | 3.142 | 125.664 | 40.000 |

Changing from a circular cross section to a generally rectangular one with the same area results in an increase in the ratio of perimeter to area similarly to the elliptical profile described above. This increase in perimeter will again provide the advantage of increasing the intersection area between the Venturi gap and the suction port, resulting in an increase in suction port flow.

Another way to increase suction flow would be to lengthen the distance between the outlet end 132 of the motive cone 128 and the inlet end 134 of the discharge cone 129. As the motive flow travels through the Venturi gap it mixes with suction air. This combined flow has the effect of increasing the static pressure towards the discharge end of the Venturi. Lengthening this distance offers diminishing returns, and because the motive flow is largely unconstrained in the Venturi, offers the risk of turbulence and flow disturbance, which would reduce the velocity and increase static pressure. Accordingly, the increase in perimeter described above is preferred over lengthening the distance, but the two could be combined to avoid the diminishing returns.

The Venturi devices disclosed herein may be molded as a monolithic body. In one embodiment, the Venturi devices are formed by injection molding.

In one embodiment, the Venturi gap 152 is a lineal distance proportional to the (motive mass flow rate)$^n$, wherein n is 0.25 to 0.8, and the offset between the motive outlet and the discharge inlet is also proportional to the (motive mass flow rate)$^n$, where n is 0.25 to 0.8, and the elliptical- or polygonal-shaped internal cross-section of the outlet end has an eccentricity of between 0 to, and including 1, or more preferably between about 0.4 to, and including about 0.97. When the Venturi device is included in a system having a device requiring higher amounts of vacuum, n for the Venturi gap and n for the offset may both be 0.4 to 0.6. In one embodiment, n for the Venturi gap and n for the offset are both 0.5 and the eccentricity is between about 0.4 to, and including 0.97. In another embodiment, the gap ratio is set at a value equal to the ellipse minor diameter when the ellipse major diameter divided by three is equal to the ellipse minor diameter, wherein each value is accurate to +/−10%.

In operation, for example when the Venturi device is connected into an engine, engine air, i.e. filtered air, can be connected to enter the Venturi device at the motive port. Air exiting the Venturi device at the discharge port can be connected to the engine air at a point where the pressure is lower than that of the motive port. The motion of the air from the motive to discharge port draws the air down the motive cone, which can be a straight cone or a hyperbolic profile as described above. The reduction in area causes the velocity of the air to increase. Because this is an enclosed space the laws of fluid mechanics state that the static pressure must decrease when the fluid velocity increases. The minimum cross-sectional area of the motive cone abuts the Venturi gap. As air continues to travel to the discharge port it travels through the discharge cone, which is either a straight cone or a hyperbolic profile. Optionally, the discharge region can continue as a straight or hyperbolic profile cone until it joins the discharge port, or it can transition to a simple cylindrical or tapered passage. The minimum cross-sectional area end of the discharge cone is larger than that of the minimum cross section area end of the motive cone. The larger area is to provide area for the flow of air from the suction port. This change in area down the discharge cone slows the air velocity down again, with a subsequent increase in its static pressure.

The Venturi gap connects to the suction port, which exposes air in the suction port/passage to the same low static pressure that exists in the air passing at high velocity between the motive and discharge cones. The pressure created here can be lower than the pressure at the discharge port, which is known already to be lower than that at the motive port. This low pressure may be used for a variety of applications on a vehicle, such as for evacuating a vehicle brake boost canister, as is known to those skilled in the art. Under some circumstances, primarily when the gasoline engine is lightly loaded, the pressure at the discharge port is low enough to quickly lower the pressure at the application device. Since the area of the connection between the discharge cone or passage and the bypass passage is quite large relative to the connection between the suction passage and the Venturi gap, this optional connection can assist in evacuation of the application device initially.

For a comparison study a 3 gps Venturi device having an elliptical motive outlet and an elliptical discharge inlet at the Venturi gap and a hyperboloid internal profile in the motive and discharge sections (referred to as the "hyperboloid ellipse Venturi device") as illustrated in FIG. 7 was operated under conditions of 10 kPa manifold vacuum, 15 kPa manifold vacuum, and 20 kPa manifold vacuum with increasing brake boost canister vacuum and compared to a 3 gps conical circular Venturi device under the same conditions. A conical circular Venturi device is one that has a circular motive outlet and a circular discharge inlet and a conical internal profile in the motive and discharge sections. As evidenced by the data presented in FIG. 8, the hyperboloid ellipse Venturi device provided a synergistic effect of the hyperboloid internal profile with the ellipse-shaped openings that exceeded the results of the conical circular Venturi device. At 10 kPa, 15 kPa, and 20 kPa manifold pressure, the hyperboloid ellipse Venturi device provided higher suction flow rates over an increasing range of brake boost canister vacuum from 12 kPa to about 67 kPa. Interestingly, at 15 kPa manifold pressure the hyperboloid ellipse Venturi device performed generally similar to the conical circular Venturi device when it was at 20 kPa manifold pressure, evidencing unexpected, superior performance.

Figure 8:
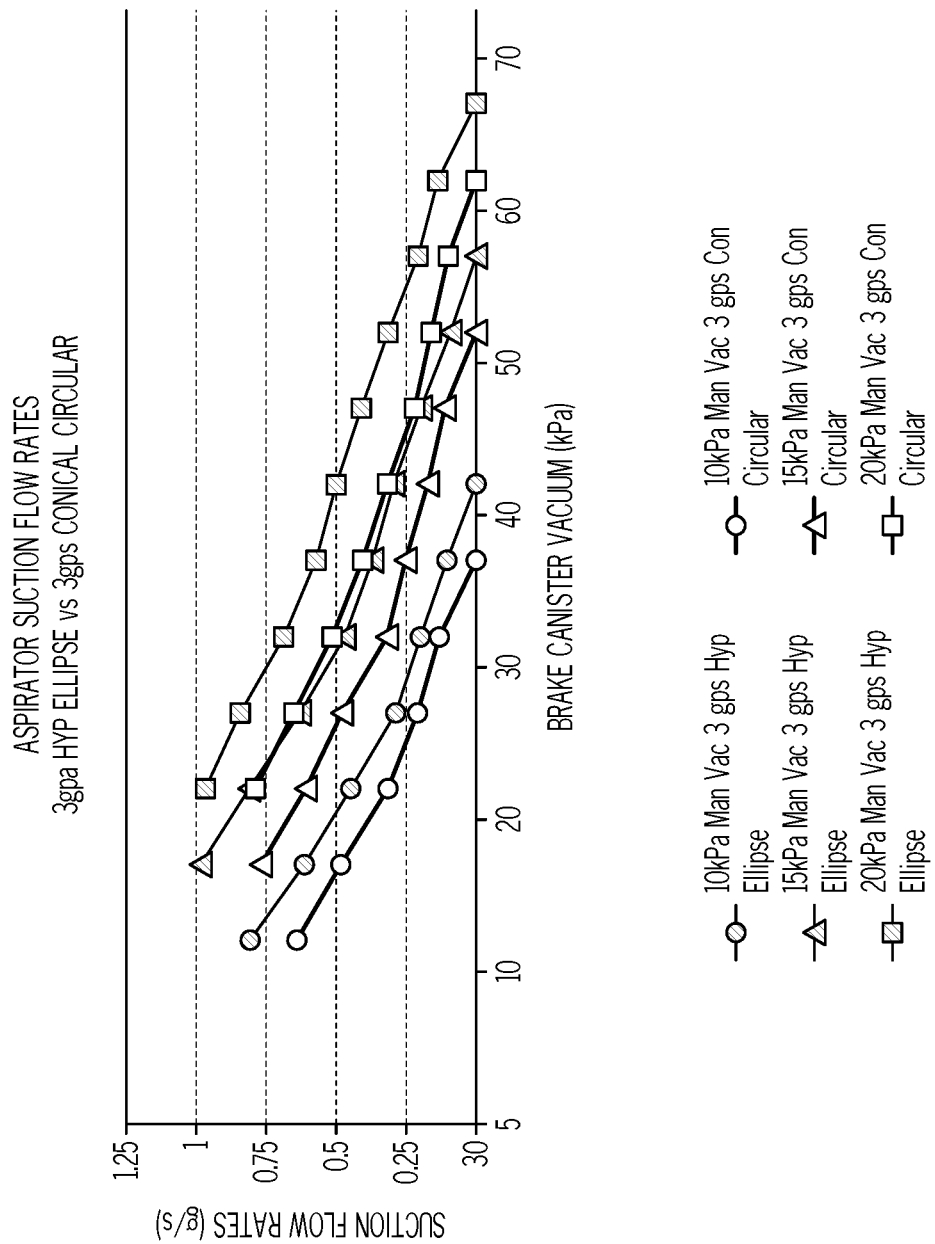
FIG. 8 is a graphical representation comparing the Venturi device suction flow rates of a hyperboloid ellipse Venturi device disclosed herein against a conical circular Venturi device (prior art) at different selected manifold vacuum values.
Figure 9:
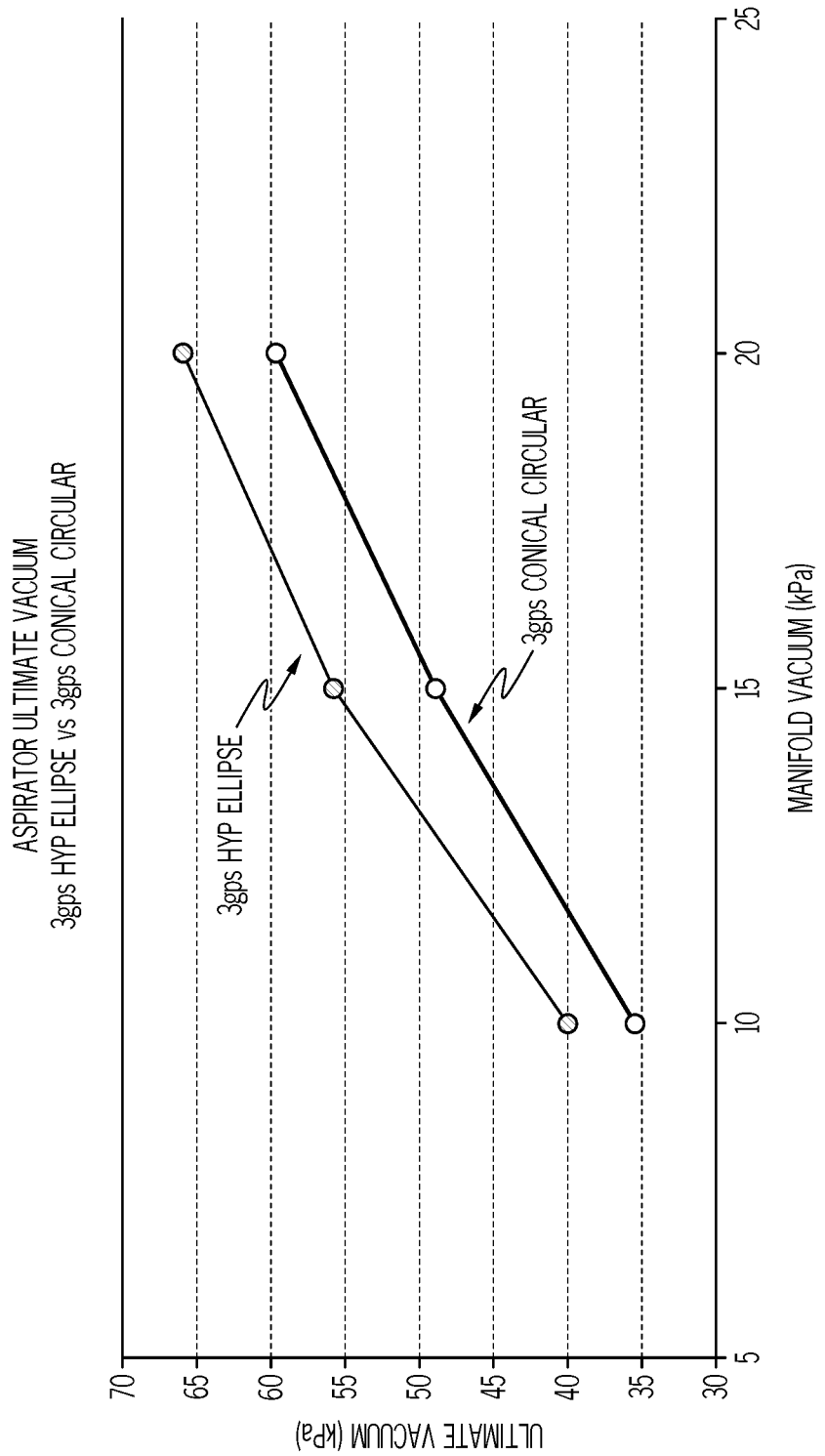
FIG. 9 is a graphical representation comparing the vacuum of a hyperboloid ellipse Venturi device disclosed herein against a conical circular aspirator (prior art) as the manifold vacuum increases.
Figure 10:
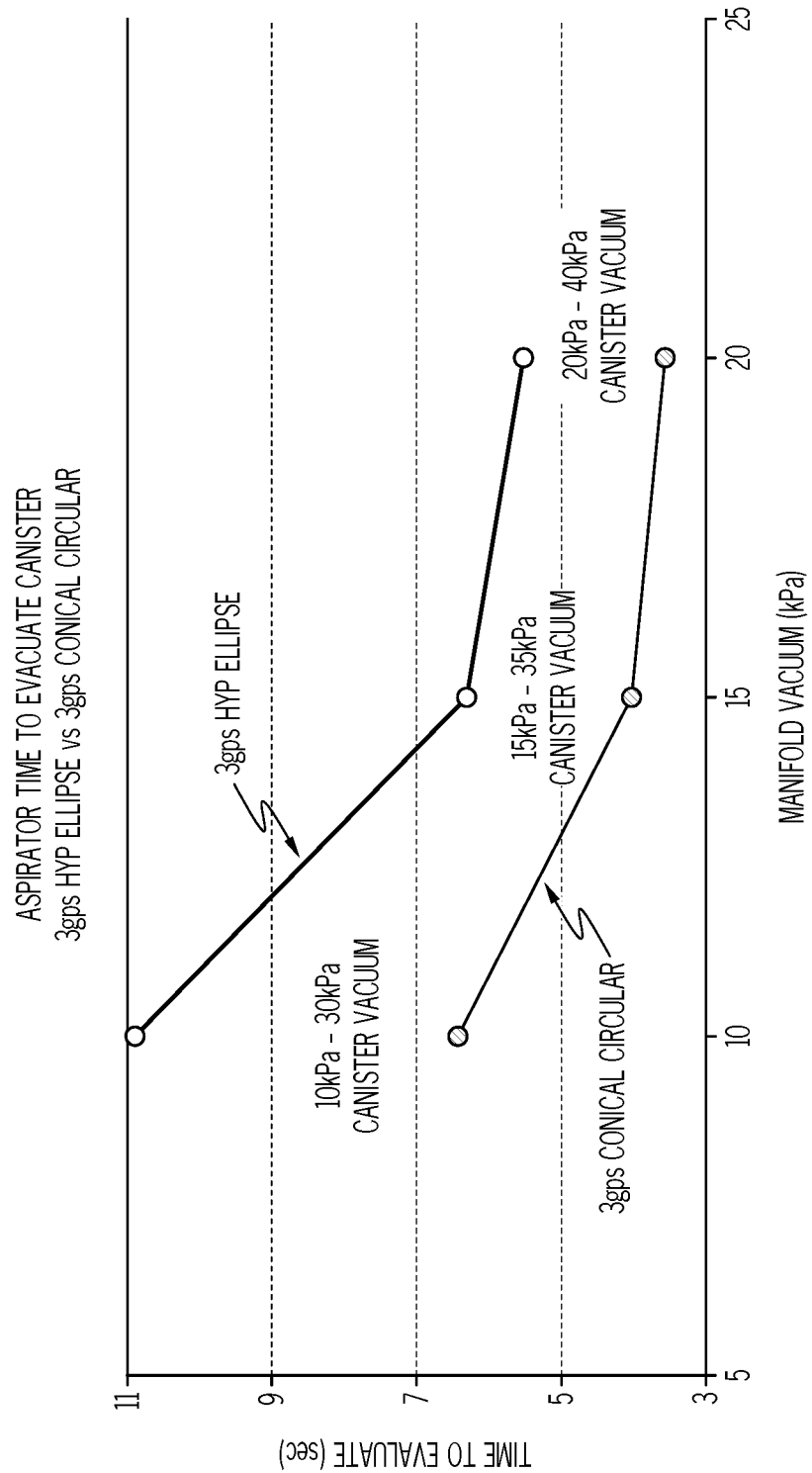
FIG. 10 is a graphical representation comparing the time to evacuate a canister by a hyperboloid ellipse Venturi device disclosed herein against a conical circular aspirator (prior art) as the manifold vacuum increases.

Referring now to FIGS. 9 and 10, the same Venturi devices compared for FIG. 8 were compared with respect to the ultimate vacuum the Venturi device could generate and the time needed for the Venturi device to evacuate a canister to create vacuum. For the tests, the outlet 112 was in fluid communication with an intake manifold of the engine, the suction port was in fluid communication with a vehicle brake boost canister, and the motive inlet was connected to a source of clean air. As shown in the graph of FIG. 9, the hyperboloid ellipse Venturi device disclosed herein provides a deeper vacuum compared to the conical circular Venturi device under the same operating conditions, i.e., at 10, 15, and 20 kPa of manifold vacuum the hyperboloid ellipse Venturi device had an ultimate vacuum that was greater by at least 5 kPa. Additionally, as seen in FIG. 10, the hyperboloid ellipse Venturi device was superior in evacuating a brake boost canister compared to the conical circular Venturi device. At a manifold vacuum pressure of 10 kPa, the hyperboloid ellipse Venturi device was over just under 4.5 seconds faster at evacuating the canister. At 15 kPa and 20 kPa of manifold vacuum the hyperboloid ellipse Venturi device was about 2 seconds faster. Faster evacuation times at lower manifold vacuum provides for faster reaction time and improved performance. But, as seen in these graphs, not only does the Venturi device with the hyperboloid elliptical profile have faster evacuation time, it also provides a deeper vacuum at manifold vacuums of 10, 15, and 20 kPa. This dual benefit was a surprising, unexpected result from changing the shapes of the motive outlet and the discharge inlet that defines the Venturi gap and using an internal passageway that changes/taper according to a hyperbolic function.

Figure 11:
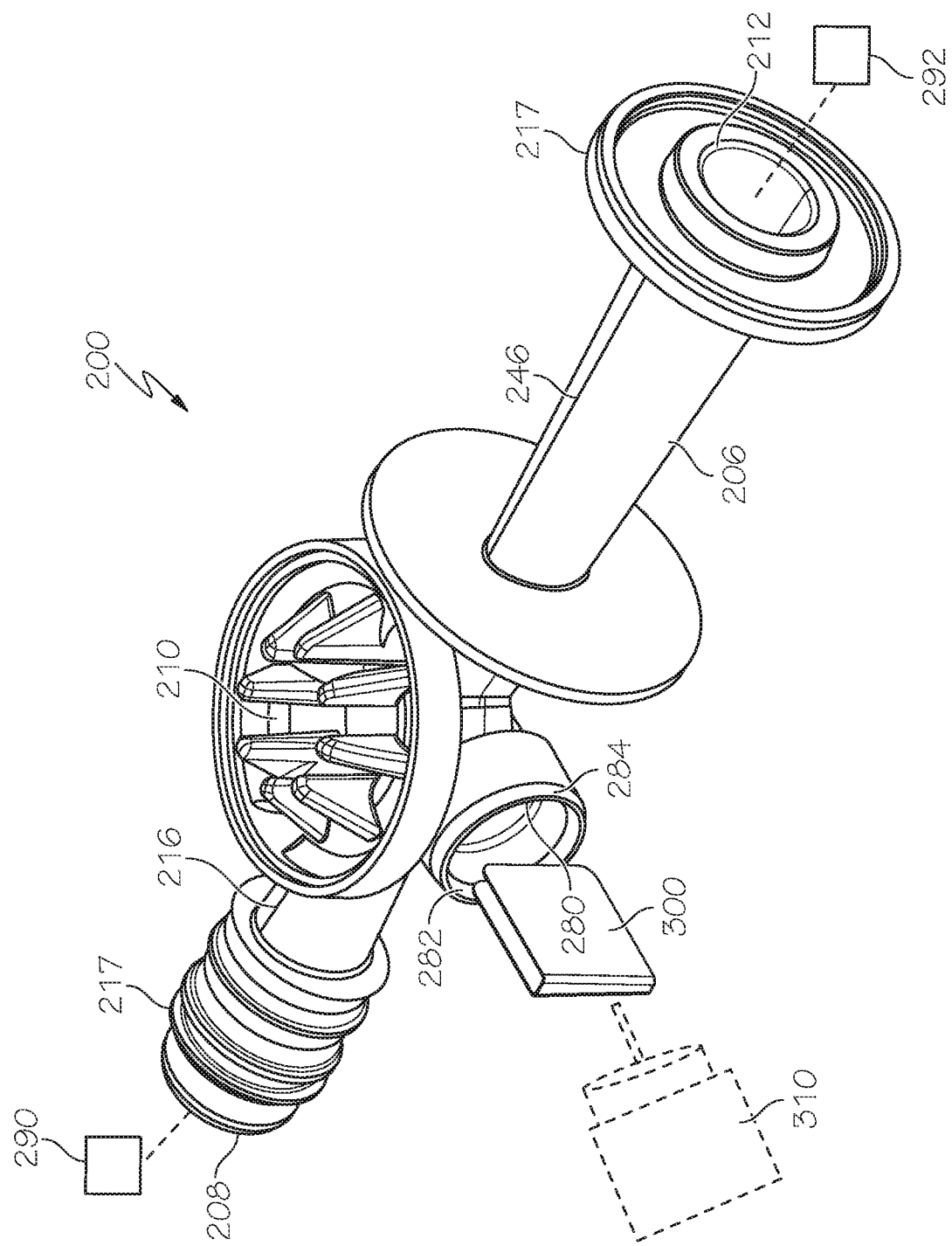
FIG. 11 is a side, perspective view of a lower housing section of a Venturi device having a gate valve linearly translatable into the Venturi gap.

Turning now to FIGS. 11-13, any of the various embodiments of the Venturi device for generating vacuum described herein may include a valve gate 300 within the Venturi gap 252 to control the passage of fluid from the motive section 216 to the discharge section 246. The Venturi device 200 has a body, such as lower body 206 in FIG. 11, defining a Venturi gap between an outlet end 232 of the converging motive section 216 and an inlet end 234 of a diverging discharge section 246, and a suction port 210 in fluid communication with the Venturi gap 252, a gate valve 300 linearly translatable to open and close the Venturi gap 252, and an actuator 310 connected to the gate valve 300 to operatively move the gate valve 300 between an open position O (FIG. 13) and a closed position C (FIG. 12). The converging motive section 216 defines a circular-shaped motive inlet 208 and defines an elliptical- or polygonal-shaped motive outlet 233, and the diverging discharge section 246 defines an elliptical- or polygonal-shaped discharge inlet 235.

Figures 17, 18:
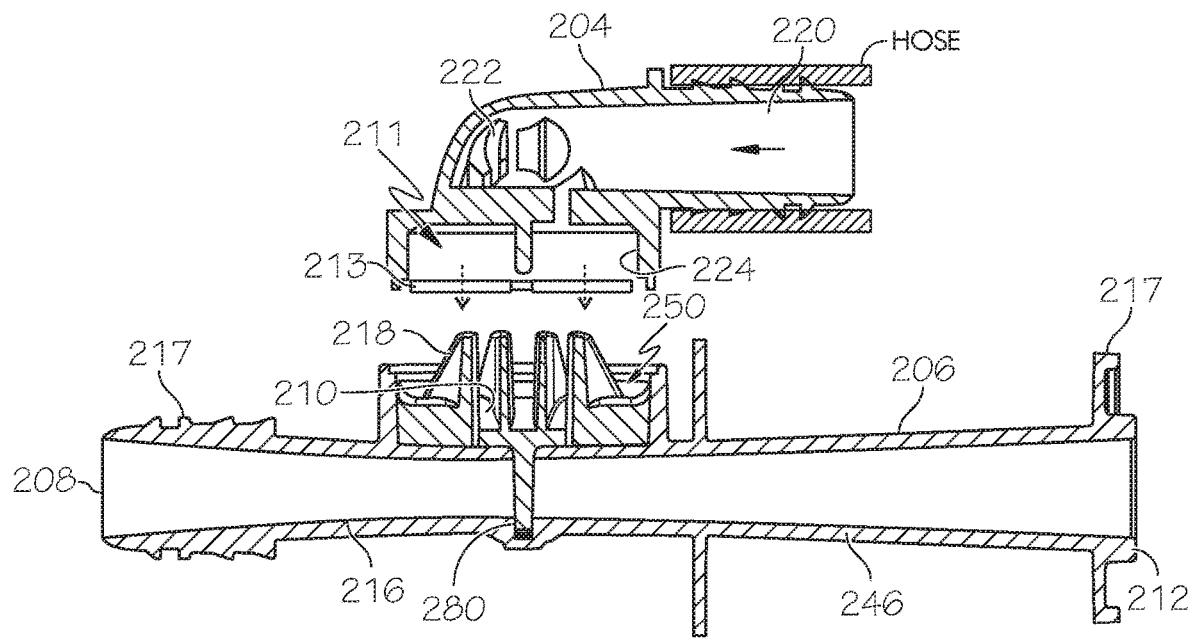
FIG. 17 is a chart of data from a performance comparison of a gated Venturi device to a non-gated Venturi device under the same conditions.
FIG. 18 is an unassembled, longitudinal cross-sectional view of an embodiment of the Venturi device.

Each of the respective ports 208 and 212 may include a connector feature 217 on the outer surface thereof for connecting the respective port to a hose or other component in the engine. The other ports 210 and 282 may each include a lip or other types of connector for sealing connecting to other components with fluid tight seals, for example, an upper housing 204 to suction port 210 and an actuator 310 to the port 282. Referring to FIG. 18, the upper housing 204 and the lower housing 206, at the junction of the suction port 210, may form a check valve 211 having a sealing disc 213 seated therein. The fingers 218 extending upward away from the suction port 210 of the lower body 206 define a seat for the sealing disc 213 for an open position of the check valve 211. The upper housing 204 defines a passageway 220 leading to an entrance 222, which may comprise a plurality of openings, to a chamber 224 of the check valve 211 and, hence, to the suction chamber 250 of the lower body 206.

The lower body 206 defines a gate pocket 280 that transects a central longitudinal axis A of the converging motive section 216. The gate pocket 280 terminates at the exterior of the lower body 206 with a connector 281 connectable to an actuator 310. The gate pocket 280 has a trapezoid-shape, viewed in cross-section parallel to the central longitudinal axis A, that is wider at an end more proximate the suction port 210 than at its opposite end.

With reference to FIGS. 11-16, the gate valve 300 is slidingly seated within the gate pocket 280. The gate valve 300 is made of a thin piece of non-corroding metal or plastic folded, bent, or molded into a generally U-shaped continuous piece, viewed in longitudinal cross-section (FIG. 16), shaped to close off the motive exit 233 and the discharge inlet 235 when in the closed position C of FIG. 12. The continuous, opposing sides 302, 304 are spaced apart a distance apart to define void 308 therebetween that is in fluid communication with the suction port 210 at all times. A first side 302 of the gate valve 300 is in sealing engagement with the outlet end 233 of the converging motive section 216 and the second side 304 is in sealing engagement with the inlet end 235 of the diverging section 246. The opposing sides 302, 304 of the gate valve 300 each act as a leaf spring, biased generally away from one another to form the sealing engagements. In particular, in its free, uninstalled condition, the size, i.e., the distance from the surface 302 to the surface 304, as measured at either the top or bottom 314 or the top 312, is such that the surfaces touch the outlet end 233 of the motive and the inlet end 235 of the discharge. This provides two benefits to this invention. Firstly, the drag created by the interference will ensure that the valve 300 will remain fixed in position when in either the closed position C or the open position O. This will eliminate any wear that would occur if the valve 300 was free to rattle about. Secondly, during operation, the difference in pressure between the motive port and the discharge port biases the gate always in the same direction, toward the discharge passage. By ensuring that the valve 300 is biased against toward the discharge passage, potential leakage between the motive port and the discharge port is minimized.

As seen in FIG. 15, the gate valve 300 has a trapezoid-shaped back 306 that is wider at an end 312 more proximate the suction port 210 than the opposite end 314.

In one embodiment, the actuator 310 is a pneumatic actuator connected to the gate valve to operatively move the gate valve between the open position O and the closed position C. The pneumatic actuator may be operated using the very vacuum created by the Venturi device for a self-regulated system configuration. Example pneumatic actuators are discussed in co-pending U.S. application Ser. No. 14/154,268 and Ser. No. 14/277,815. In another embodiment, the actuator 310 is an electromagnetic actuator connected to the gate valve 300 to operatively move the gate valve between an open position and a closed position, for example, a solenoid. An example solenoid is discussed in co-pending U.S. application Ser. No. 14/473,151.

As seen in FIG. 11, the gate valve 300 is positioned relative to the elliptical- or polygonal-shaped motive outlet 233 for linear translation at the shortest stroke distance, which is in a plane parallel to a minor axis of the motive outlet 233. For example, a circular discharge inlet having a 4 mm radius has a stroke distance of 4 mm, but an ellipse-shaped discharge inlet having the same area as the 4 mm circle having a minor axis of 2.3 mm, only has a stroke distance of 2.3 mm. This is nearly half the distance for a circular discharge inlet.

In the illustrated embodiments of FIGS. 11 and 18, the gate valve 300 is positioned to enter the suction chamber 250 from the side of the lower body 206, rather than from the top or bottom of the lower body. This construction aligns the gate valve 300 with the minor axis of the ellipse-shaped discharge inlet and provides the shortest stroke distance, which reduces both the time to travel from the open position O to the closed position C or vice versa, as well as the size of the actuation device, either an electromagnet or pneumatic.

Moreover, referring to FIG. 17, unexpected results were found with the introduction of the gate valve 300 into the construction of the lower body 206. When the gate valve is present, compared to an equivalent Venturi device without a gate valve (i.e., a non-gated Venturi device), the flow in grams per second is higher by an increase of about 5.5% for a 10 kPa source vacuum and by an increase of about 2% for a 20 kPa source vacuum. Also, for the 10 kPa source vacuum, the suction vacuum increased by about 3%. The inventors expected the introduction of the gate to decrease performance slightly, but it actually improved the performance in at least one aspect under both 10 kPa and 20 kPa source vacuum, as shown in FIG. 17.

Figure 19:
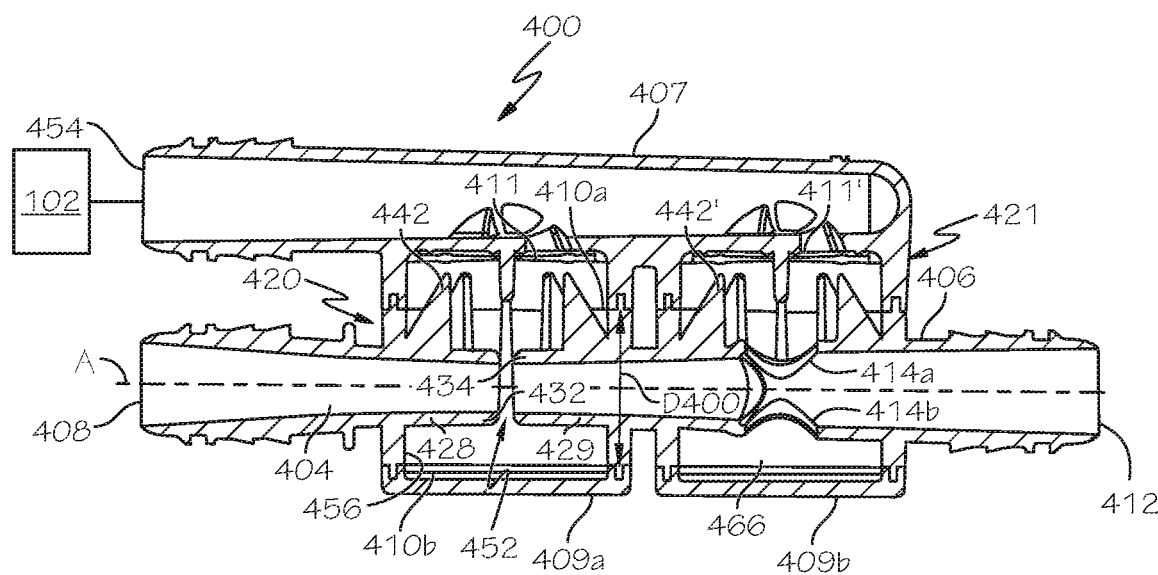
FIG. 19 is a side, longitudinal cross-sectional, plan view of another embodiment of a Venturi device.
Figure 20:
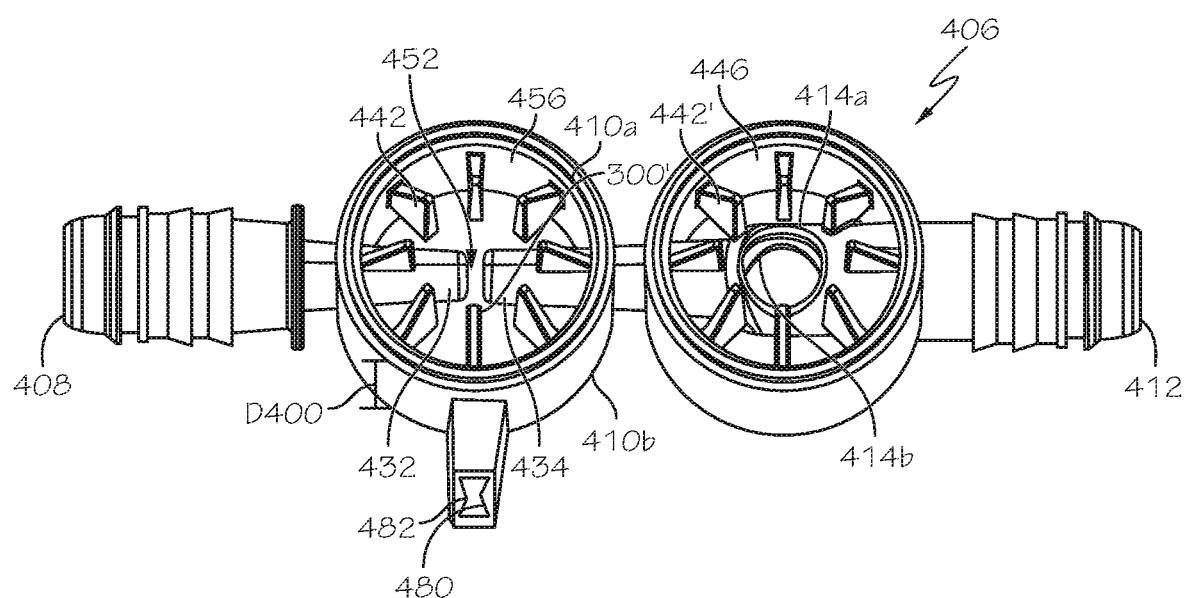
FIG. 20 is a side, perspective view of just the body of the Venturi device of FIG. 19.

Referring now to FIGS. 19 and 20, an alternate embodiment of a Venturi device, generally designated 400, is disclosed. The Venturi device 400 is connected to a device requiring vacuum 102, and includes a body 406 defining passageway 404 and having a variety of ports including a motive port 408, a pair of suction ports 410a, 410b, an aspirator outlet 412, a suction housing 407 connected to the body 406 with fluidtight/airtight seals, for example by sonic welding, heating, or other conventional methods for forming such seals therebetween, and, optionally, dual bypass ports 414a, 414b. The suction housing 407 and the body 406, together, form check valve 420 and/or 421, which if present include a sealing member 411, 411', respectively. Additionally, Venturi device 400 includes a first cap 409a and a second cap 409b defining an end of the chamber 456 and an end of chamber 466, respectively. The first and second caps 409a, 409b are connected thereto with fluidtight/airtight seals, for example by sonic welding, heating, or other conventional methods for forming such seals. Instead of caps 409a and 409b, the body 406 may be molded such that these are integral closed chambers.

The body 406 defines passageway 404 along a central longitudinal axis bisected by the suction ports 410a, 410b. The inner passageway 404 includes a first tapering portion 428 and the second tapering portion 429 aligned end to end with the motive outlet end 432 facing the discharge inlet end 434 and defining a Venturi gap 452 therebetween. Components of the Venturi device 400 not described below are understood to be analogous to those described above with respect to the other embodiments.

The body 406 of FIGS. 19 and 20 further defines a chamber 456 spacing the first suction port 410a and the second suction port 410b apart from one another by a distance $D_{400}$. The chamber 456 includes a plurality of fingers 442 extending radially inward and axially away (upward in the figures) from the passageway 404 of the body 406. The plurality of fingers 442 are arranged radially as individual protrusions from an inner wall of the chamber 456 in an orientation where immediately adjacent neighboring fingers are spaced a distance apart from one another and define a void therebetween that is in fluid communication with the second suction port 410b. The plurality of fingers 442 define a seat for the sealing member 411 as part of check valve 420. Similarly, the check valve 421, if the bypass port(s) 414a, 414b are present, has a chamber 466 defined by the body 406 that includes a plurality of fingers 442' extending radially inward and radially away (upward in the drawings) from the passageway 404 of the body 406 that collectively define a seat for the sealing member 411'. The plurality of fingers 442' are arranged radially as protrusion from an inner wall of the chamber 466 in an orientation where immediately adjacent neighboring fingers are spaced a distance apart from one another. Each of the plurality of fingers 442, 442' has a base that is wider than at an apex thereof. The apexes of the plurality of fingers 442 collectively define the seat for the sealing member 411 for an open position, and the apexes of fingers 442' define the seat for sealing member 411' for an open position.

Referring to FIG. 20, the body 406 also includes a port 482 that defines a gate pocket 480. The port 482 and the gate pocket 480 transect the central longitudinal axis A of the Venturi device 400. The gate pocket 480 may terminate at the exterior of the body 406 with a connector connectable to an actuator as shown in FIG. 11. The gate pocket 480 is shaped to receive the gate valve 300' of FIG. 22 and is generally hour-glass shaped as viewed from the port end. The gate valve pocket 480 is positioned for the gate valve 300' to enter the suction chamber 456 from the side of the body 406, rather than from the top or bottom of the lower body. This construction aligns the gate valve 300' with the minor axis of the ellipse-shaped discharge inlet and provides the shortest stroke distance, which reduces both the time to travel from the open position O to the closed position C or vice versa, as well as the size of the actuation device, either an electromagnet or pneumatic.

Figure 21:
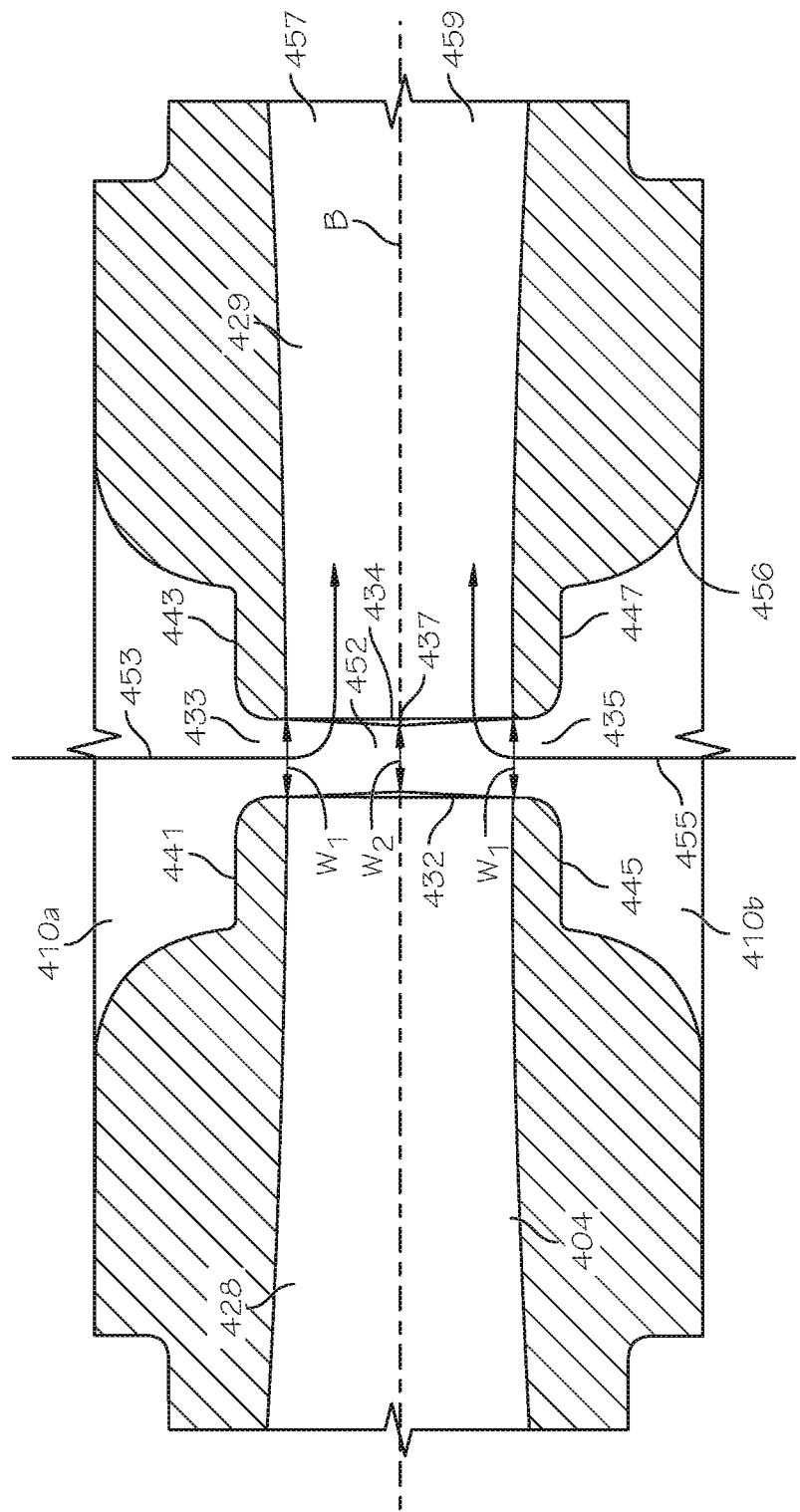
FIG. 21 is a detailed view of the Venturi gap of the Venturi device of FIG. 19.

Referring now to FIG. 21, the Venturi gap 452 between the motive outlet end 432 and the discharge inlet end 434 is shown in greater detail. The body 406 further defines a chamber 456 spacing the first suction port 410a and the second suction port 410b apart from one another by a distance $D_{400}$ as labeled in FIGS. 19 and 20. The outlet end 432 of the motive section extends into the chamber 456 at a position where the chamber 456 provides fluid flow around the entire outer surface of the outlet end 432, and an inlet end 434 of the discharge section 146 extends into the chamber 456 at a position where the chamber 456 provides fluid flow around the entire outer surface of the inlet end 434. Suction port 410a is positioned proximate a top portion 441 of the motive outlet end 432 and a top portion 443 of the discharge inlet end 434, which define an upper portion 433 of the Venturi gap 452. Suction port 410b is positioned proximate a lower portion 445 of the motive outlet end 432 and a lower portion 447 of the discharge inlet end 434, which define a lower portion 435 of the Venturi gap 452. The width of the Venturi gap 452 tapers symmetrically from a maximum width $W_1$ at the upper and lower portions 433, 435 of the Venturi gap 452 proximate the suction ports 410a, 410b to a minimum width $W_2$ at a center portion 437 thereof. As a result, the void defined by the Venturi gap 552 is symmetrical about a plane bisecting the passageway 404 into upper and lower halves 457, 459 (in the illustrated embodiment, above and below axis B), thereby improving flow conditions and decreasing turbulence and resultant noise as fluid flows through the Venturi gap 452 as compared to aspirator systems incorporating Venturi gaps with asymmetrical (e.g., conical or tapered) configurations.

The Venturi device 400, incorporating the pair of suction ports 410a, 410b on either side of the Venturi gap 452, also provides improved suction flow rate for a given motive flow and discharge pressure as compared to a system incorporating a single suction port 410 because the disclosed system provides greater capacity to utilize the Venturi effect created by the motive flow through passageway 404. With continued reference to FIG. 21, arrows 453 and 455 indicate the fluid flow path through the upper and lower suction ports 410a, 410b. Venturi forces generated by the motive flow through the upper half 457 of the passageway 404 across the Venturi gap 452 yield suction primarily along flow path 453 through suction port 410a. Venturi forces generated by the motive flow through the lower half 459 of the passageway 404 across the Venturi gap 452 yield suction primarily along flow path 455 through suction port 410b.

Figure 22:
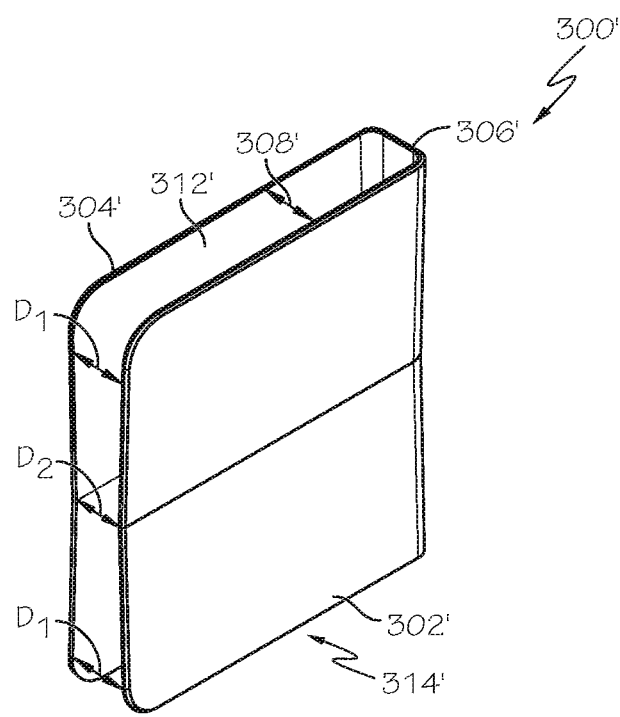
FIG. 22 is a side, perspective view of a second embodiment of a gate valve.
Figure 23:
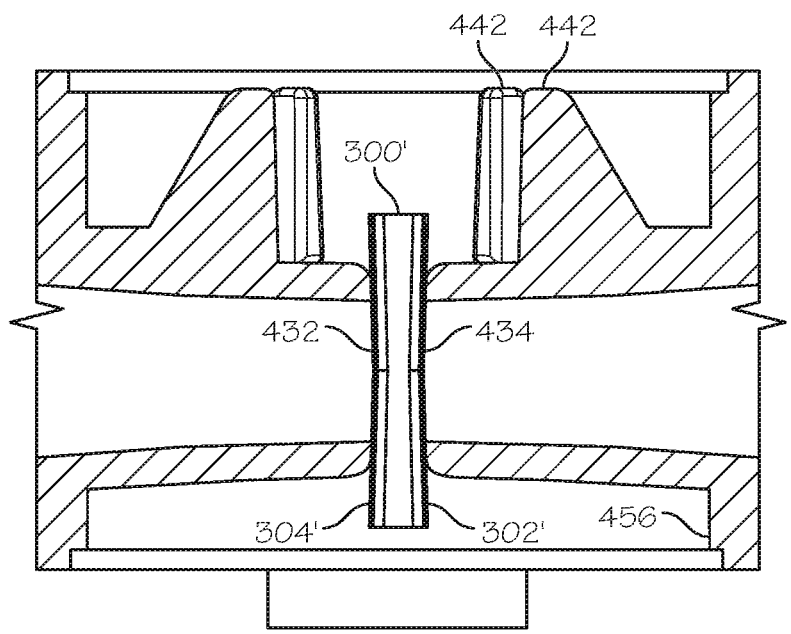
FIG. 23 is an enlarged, longitudinal cross-section through the Venturi gap of the Venturi device of FIG. 19 with the gate valve of FIG. 22 inserted into the Venturi gap.

With reference to FIGS. 22 and 23, the gate valve 300' is slidingly seated within the gate pocket 480 such that it is linearly translatable to open and close the Venturi gap 452. The gate valve 300' is made of a thin piece of non-corroding metal or plastic folded, bent, or molded into a generally U-shaped continuous piece, similar to the view of FIG. 16, shaped to close off the motive exit and the discharge inlet when in the closed position of FIG. 23, and has similar characteristics, advantages, and unexpected results to those described above for gate valve 300. The continuous, opposing sides 302', 304' are spaced apart a distance apart to define void 308' therebetween that is in fluid communication with the suction ports 410a, 410b at all times. The void 308' does not have a uniform width along the height thereof. Instead, the first side 302' and the second side 304' are spaced apart from one another a first distance $D_1$ at its upper and lower surfaces 312', 314' and a second distance $D_2$ at a central plane positioned between the upper and lower surfaces. As such, the back 306' of the gate valve 300' is generally shaped like an hour glass, wider at the ends more proximate the two suction ports 410a, 410b and narrower at its middle.

A Venturi device similar to those in FIGS. 19-20, but having a mirror check valve a second "upper" body 407 opposite the check valve 420 of FIG. 19, is disclosed in co-pending U.S. application Ser. No. 14/734,228 in the embodiment illustrated in FIGS. 9-10, which can also have a port 482 and pocket 480 for housing the gate valve 300'.

Although the invention is shown and described with respect to certain embodiments, it is obvious that modifications will occur to those skilled in the art upon reading and understanding the specification, and the present invention includes all such modifications.

What is claimed is:

1. A Venturi device for generating vacuum comprising:
a body defining a Venturi gap between an outlet end of a converging motive section that defines a motive outlet and an inlet end of a diverging discharge section that defines a discharge inlet; and
a suction port in fluid communication with the Venturi gap;
a gate valve linearly translatable to open and close the Venturi gap, the gate valve being generally U-shaped in longitudinal cross-section, thereby having continuous, opposing sides that each close off one of the motive outlet and the discharge inlet such that there is no flow therebetween when the gate valve is in a closed position, the gate valve defining a gate valve void between the opposing sides that is in fluid communication with the suction port; and
an actuator connected to the gate valve to operatively move the gate valve between an open position and the closed position.

2. The Venturi device of claim 1, wherein the opposing sides of the gate valve each act as a leaf spring, biased generally away from one another.

3. The Venturi device of claim 1, defining a gate pocket that transects a central longitudinal axis of the converging motive section, the gate valve slidingly seated within the gate pocket.

4. The Venturi device of claim 3, wherein the gate valve has a trapezoid-shaped back that is wider at an end more proximate the suction port or has a generally hour-glass-shaped back that is wider at opposing ends than in a middle region.

5. The Venturi device of claim 1, wherein the motive outlet is elliptical- or polygonal-shaped, and the discharge inlet is elliptical- or polygonal-shaped; wherein elliptical-shaped has an eccentricity greater than 0.

6. The Venturi device of claim 5, wherein the gate valve is positioned relative to the elliptical- or polygonal-shaped motive outlet for linear translation at a shortest stroke distance in a plane parallel to a minor axis of the motive outlet.

7. The Venturi device of claim 5, wherein the converging motive section defines an inner passageway that transitions as a hyperbolic function from a circular-shaped motive inlet to the elliptical- or polygonal-shaped motive outlet, and wherein the elliptical- or polygonal-shaped motive outlet has an area that is less than the area of the circular-shaped motive inlet.

8. The Venturi device of claim 5, wherein the Venturi gap is proportional to the (motive mass flow rate)$^n$, wherein n is within the range of 0.25 to 0.8.

9. The Venturi device of claim 1, wherein the actuator is a pneumatic actuator or a solenoid actuator connected to the gate valve to operatively move the gate valve between the open position and the closed position.

10. The Venturi device of claim 1, wherein the suction port extends downward around the sides of the outlet end of the converging motive section and the sides of the inlet end of the diverging discharge section; and wherein the exterior profile of the outlet end of the converging motive section and the inlet end of the diverging discharge section generally match their respective internal shapes.

11. A system comprising the Venturi device of claim 1 having the suction port in fluid communication with a device requiring vacuum and the converging motive section in fluid communication with a source of fluid.

12. The system of claim 11, wherein the source of fluid is a compressor of a super- or turbocharger in an internal combustion engine.

13. The system of claim 12, wherein the diverging discharge section defines a discharge exit opposite the inlet end, wherein the discharge exit is in fluid communication with an intake manifold of the internal combustion engine.

14. The system of claim 11, wherein the source of fluid is atmospheric air from an air intake filter in an internal combustion engine.

15. The system of claim 14, wherein a discharge exit is in fluid communication with an intake manifold of the internal combustion engine.

16. The system of claim 11, wherein the opposing sides of the gate valve each act as a leaf spring, biased generally away from one another, one into engagement with the outlet end of the converging motive section and the other into engagement with the inlet end of the diverging discharge section.

17. The system of claim 11, defining a gate pocket that transects a central longitudinal axis of the converging motive section, wherein the motive outlet is elliptical- or polygonal-shaped and the gate valve is slidingly seated within the gate pocket in a position relative to the elliptical- or polygonal-shaped motive outlet for linear translation at a shortest stroke distance in a plane parallel to a minor axis of the motive outlet; wherein elliptical-shaped has an eccentricity greater than 0.

18. The system of claim 11, wherein the gate valve has a trapezoid-shaped back that is wider at an end more proximate the suction port.

19. The system of claim 11, wherein the converging motive section defines an inner passageway that transitions as a hyperbolic function from a circular-shaped motive inlet to the motive outlet, and wherein the motive outlet is elliptical or polygonal-shaped and has an area that is less than the area of the circular-shaped motive inlet; wherein elliptical-shaped has an eccentricity greater than 0.

* * * * *